(12) United States Patent
Gupta et al.

(10) Patent No.: US 7,921,405 B2
(45) Date of Patent: *Apr. 5, 2011

(54) FACILITATION OF MULTI-PROJECT MANAGEMENT USING THROUGHPUT MEASUREMENT

(75) Inventors: Sanjeev Gupta, San Jose, CA (US); Ajai Kapoor, San Jose, CA (US); Ravi Shankar, San Jose, CA (US); Corvin Bazgan, San Carlos, CA (US); Anthony Hoang, Milpitas, CA (US)

(73) Assignee: Realization Technologies, Inc., San Jose, CA (US)

( * ) Notice: Subject to any disclaimer, the term of this patent is extended or adjusted under 35 U.S.C. 154(b) by 1285 days.

This patent is subject to a terminal disclaimer.

(21) Appl. No.: 11/221,447

(22) Filed: Sep. 7, 2005

(65) Prior Publication Data
US 2006/0010418 A1    Jan. 12, 2006

Related U.S. Application Data

(63) Continuation-in-part of application No. 10/700,431, filed on Nov. 4, 2003.

(51) Int. Cl.
    G06F 9/44    (2006.01)
    G06F 9/46    (2006.01)
(52) U.S. Cl. .............. 717/102; 717/100; 717/105; 705/8
(58) Field of Classification Search .................. None
    See application file for complete search history.

(56) References Cited

U.S. PATENT DOCUMENTS

| | | | | |
|---|---|---|---|---|
| 5,671,361 A | * | 9/1997 | Brown et al. | 705/9 |
| 5,745,110 A | * | 4/1998 | Ertemalp | 715/764 |
| 6,501,473 B1 | * | 12/2002 | Hayes et al. | 345/440 |
| 7,349,863 B1 | * | 3/2008 | Pena-Mora et al. | 705/8 |
| 7,669,179 B2 | * | 2/2010 | Gupta et al. | 717/101 |
| 7,774,742 B2 | * | 8/2010 | Gupta et al. | 717/101 |
| 2002/0169647 A1 | * | 11/2002 | Newbold | 705/8 |
| 2003/0033187 A1 | * | 2/2003 | Jones et al. | 705/9 |
| 2004/0117046 A1 | * | 6/2004 | Colle et al. | 700/99 |
| 2005/0004825 A1 | * | 1/2005 | Ehrler et al. | 705/8 |

OTHER PUBLICATIONS

Larry P. Leach, "Schedule and Cost Buffer Sizing", Boise Idaho, Dec. 2002 Larry P. Leach, Critical Chain Project Management Improves Project Performance, Idaho, 1997.*
"IT project management and virtual teams", C. Beise, Apr. 2004, pp. 129-133, <http://delivery.acm.org/10.1145/990000/982405/p129-beise.pdf>.*
"The effect of decision style on the use of a project management tool: an empirical laboratory study", Fox et al., Jun. 2005, pp. 28-42, <http://delivery.acm.org/10.1145/1070000/1066153/p28-fox.pdf>.*
"Estimation of project buffers in critical chain project management", Shou et al., Aug. 2002, pp. 162-167, <http://ieeexplore.ieee.org/stamp/stamp.jsp?tp=&arnumber=917313>.*

* cited by examiner

*Primary Examiner* — Thuy Dao
(74) *Attorney, Agent, or Firm* — Mark Terry

(57) ABSTRACT

A method on a computer for providing critical chain-based project management is disclosed. The method includes generating a list of sequential time periods for a project comprising a plurality of tasks and calculating a number of tasks for each time period. The method further includes generating a graphic that visually indicates the number of tasks for each time period and a priority of each task and providing the graphic to a user.

24 Claims, 30 Drawing Sheets

800

New Projects
  puma_02 (02/20/2004)

Constraint(s): Diagnostic Engineer(3)
802

Project ID: [puma_02]    Project Manager: [Mike Smith]
804

Requested Date: [02/20/2004]    ☑ Use Remaining Buffer For DDQ

Projected Date: [03/26/2004]    [Set Projected Date] 806

Penetration/Buffer Size: [25/124 (20 %)] working days    [Test Impact]

Cycle Time Stretch (days): [24] working days    [Accept Date]
810    812  814                              816

808

| Project | Fix | Priority | Orig. Rqst. Date | Due Date | Projected Date | Addl. Lateness | Cum. Lateness | Buffer Status |
|---------|-----|----------|------------------|----------|----------------|----------------|---------------|---------------|
| cheetah_01 | ☐ | 1 | 04/29/2003 | 04/29/2003 | 04/29/2003 | 0(0) | 0(0) | 14/124 (1 |
| jag_1 | ☐ | 2 | 05/09/2003 | 05/09/2003 | 05/09/2003 | 0(0) | 0(0) | 38/124 (3 |
| puma_01 | ☐ | 3 | 04/29/2003 | 04/29/2003 | 04/29/2003 | 0(0) | 0(0) | 38/124 (3 |
| leopard_01 | ☐ | 4 | 10/07/2003 | 10/07/2003 | 10/07/2003 | 0(0) | 0(0) | 0/124 (0 |

↑ Capacity Allocation
↓ Priority

Fix
Unfix
Commit
Set Priorities
Test Impact
Accept Dates

FACILITATION OF MULTI-PROJECT MANAGEMENT USING THROUGHPUT MEASUREMENT

CROSS-REFERENCE TO RELATED APPLICATIONS

The present U.S. Patent Application is a continuation-in-part of U.S. patent application Ser. No. 10/700,431 filed on Nov. 4, 2003 and entitled "Facilitation of Multi-Project Management Using Critical Chain Methodology." The present U.S. Patent Application claims priority to U.S. patent application Ser. No. 10/700,431, which is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention generally relates to the field of project management and more specifically to efficient critical chain-based project management utilizing throughput measurements.

BACKGROUND OF THE INVENTION

In recent years, project management software has gained increasing popularity. Close to $2 billion is spent on project management software every year. However, it is still the case that most projects, regardless of industry or type, are delivered late, over budget and under scope. Consider the statistics that show 1) over 83% of information technology (IT) projects are delivered late or over-budget, 2) projects completed by large companies have only 42% of the originally designed features and functions, 3) over 85% of engineering projects in the semiconductor industry finish late, 4) on average, high-tech projects are late by 100% despite the use of project management software and traditional tools, 5) 80% of all embedded systems are delivered late and 6) most defense projects take too long and cost too much.

Currently, a popular approach to project management is the critical path project management methodology. The critical path project management methodology has been utilized in the industry for many years. In brief, the critical path methodology teaches that every project or set of projects has one critical path that must be managed in order to realize established goals. According to the theory, every project has one longest chain of tasks/events, i.e., the critical path, which should be managed in order to maintain time and budget goals. This approach, however, does not allow for the possibility that the critical path keeps changing due to uncertainties. These uncertainties affect projects adversely and are typically the reason for time and budget overruns for large projects.

In theory, if you create a good plan and follow it, your projects will be completed on time. In reality, too many uncertainties arise along the way: requirements change, technology fails, vendors do not deliver, work materializes slower than expected, approvals are not granted on time and priorities change. As uncertainties strike, plans go awry.

Uncertainties can affect projects adversely in several ways. The cascade effect propagates delays but does not allow for the realization of gains. Projects lose time because either all of the preceding activities have not finished, or the needed resources are working elsewhere. Substantial time and capacity are lost as a result. Additionally, resources go idle waiting for work to arrive. Such idling is often not visible because people can continue to fine-tune already completed work in the meantime.

Another way in which uncertainties can affect projects adversely is multitasking, whereby people shuttle between tasks, killing productivity and stretching projects. As schedules start slipping, people are needed on multiple projects at once. As people shuttle between tasks without finishing one at a time (multitasking), this results in duration stretch, whereby each task takes longer, switching costs, whereby extra capacity is needed for task set-up and set-down, and concentration lapse, whereby quality suffers when people cannot concentrate on one task at a time.

Yet another way in which uncertainties can affect projects adversely is human behavior, whereby safeties are hidden in commitments. Having experienced constant delays, workers quickly learn to hide safeties in their estimates. However, these safeties are invariably wasted because of procrastination. With safeties embedded in commitments, it only becomes more tempting to take a slow start. Safeties are also wasted because of a lack of reporting early finishes. People do not report early finishes because they are afraid that the next time, these early finishes will become hard expectations.

A new approach to project management, the critical chain project management methodology, offers a solution to manage uncertainties in a single project environment, where resources are dedicated to individual projects. A key component to this approach suggests putting blocks of unscheduled time, called buffers, at key integration points in project plans to absorb the shocks of uncertainties. Another key component of the critical chain project management methodology suggests that buffers are managed during execution to ensure the project meets established time goals. A description of the critical chain-based project management method was first published in *Critical Chain*, by Eliyahu M. Goldratt, North River Press 1997.

This new project management approach, however, has been very difficult to implement in multi-project environments. This is because resources in a multi-project environment are not just dedicated to one project, but instead are shared across multiple projects. In a multi-project environment, buffer management based on a single project fails to work. In this environment, task priorities are needed not just within one project, but among multiple projects. Furthermore, most multi-project teams are located in multiple locations and are managed by individual project managers. These disparate teams, however, draw upon a common pool of resources on a timely basis. For this reason, implementing the critical chain project management methodology in a multi-project environment requires multi-project buffer management. Specifically, multi-project buffer management is needed in order to provide task priorities across multiple projects. Current project management software lacks multi-project buffer management and task priorities across multiple projects, hampering an organization's ability to deliver multiple projects on time and within budget.

One common problem with existing project management software based on critical chain is the lack of task prioritization across projects. Task prioritization refers to the calculation of priority for each task. Task priorities are important during execution since task managers must be able to identify, at any given time, those tasks that are most critical to the timely completion of the project. Existing project management packages based on critical chain calculate task priority within a project using a simple formula that merely reports the status of buffers, and leaves it up to the project manager to figure out what to do as a result. This is inadequate in large multi-project environments since true task priorities should include priorities across multiple projects, and should be based on multiple factors such as relative project priority, relative buffer priority, buffer consumption rates and other factors. Without the calculation of task priorities across multiple projects, managers are unable to see the Big Picture and hence properly prioritize people and resources to the correct tasks. The calculation of a task priority for a single project shows only a partial priority of a particular task.

Yet another common problem with existing project management software based on critical chain is buffer management. Currently, buffer management is executed by an administrator sitting at a workstation that is part of a network implementing the project management software. The administrator is unable to be mobile while still performing the duties of buffer management. This is inadequate and restricts the actions of the administrator.

Yet another common problem with existing project management software based on critical chain is the lack of ability to measure throughput adequately and identify execution-time bottlenecks or problem areas. As explained above, for complex or multiple projects, while a project-level progress measurement is available using buffer status, progress measurement is required at a system-level to ensure that resources are following priorities and work is proceeding at the right pace, and to identify where delays are occurring. While resource constraints can be identified based on capacity during planning, execution-time bottlenecks can arise in areas different from those identified during planning. A predictive progress measurement is needed for identifying these bottlenecks so that managers can take action. Making these progress measurements and identifying problem areas requires additional time and effort by administrators in tracking and analyzing a large number of tasks and resources. Even when a problem is identified, it can be further difficult to determine the particular resource, task manager, or resource manager where a focused effort can be made to cure the problem or bottleneck. Often, managers will identify a general area that causes delays and initiate a major overhaul or reorganization of the entire area in order to affect change. This can be inefficient and time-consuming.

Therefore a need exists to overcome the problems discussed above, and particularly for a way to facilitate critical chain-based project management to more efficiently measure throughput and identify problem areas in the task network.

SUMMARY OF THE INVENTION

The present invention, according to a preferred embodiment, overcomes problems with the prior art by providing an efficient and easy-to-implement critical chain-based project management system utilizing throughput measurement.

In an embodiment of the present invention, a method on a computer for providing critical chain-based project management is disclosed. The method includes generating a list of sequential time periods for a project comprising a plurality of tasks and calculating a number of tasks for each time period. The method further includes generating a graphic that visually indicates the number of tasks for each time period and a priority of each task and providing the graphic to a user.

In another embodiment of the present invention, an alternative method on a computer for providing critical chain-based project management is disclosed. The method includes generating a list of sequential time periods for a project comprising a plurality of tasks, wherein a task is either in-progress or pending and calculating a number of in-progress and pending tasks for each time period. The method further includes generating a first graphic that visually indicates a number of in-progress tasks for each time period and a priority of each in-progress task. The method further includes generating a second graphic that visually indicates a number of pending tasks for each time period and a priority of each pending task and providing the first and second graphic to a user.

In another embodiment of the present invention, a computer system for providing critical chain-based project management is disclosed. The computer system comprises a database for storing a project plan for a project comprising a plurality of tasks. The computer system further comprises a processor configured for: generating a list of sequential time periods for the project, calculating a number of tasks for each time period, and generating a graphic that visually indicates the number of tasks for each time period and a priority of each task. The computer system further comprises an interface for providing the graphic to a user.

In another embodiment of the present invention, a method on a computer for providing critical chain-based project management is disclosed. The method includes generating a list of sequential time periods for a project comprising a plurality of tasks and calculating a resource load for tasks pertaining to each time period. The method further includes generating a graphic that visually indicates the resource load for tasks pertaining to each time period and a priority of each task and providing the graphic to a user.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIG. 8 is a screenshot of a pipelining user interface for date reconciliation in one embodiment of the present invention.

FIG. 11 is a screenshot of a task updating user interface in one embodiment of the present invention.

FIG. 13B is a screenshot of a second task prioritization user interface in one embodiment of the present invention.

DETAILED DESCRIPTION OF THE PREFERRED EMBODIMENTS

Figure 1:
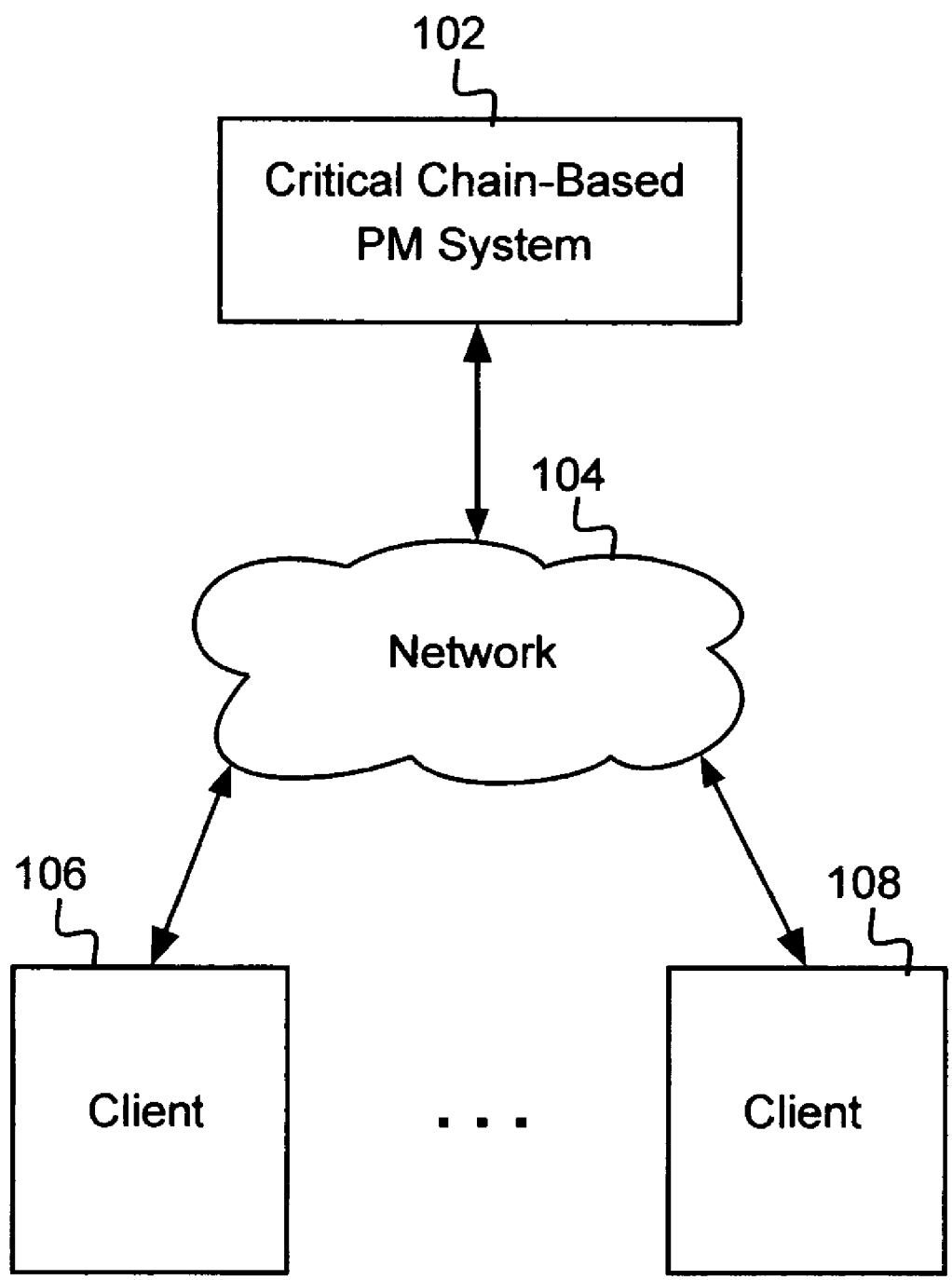
FIG. 1 is a block diagram illustrating the client-server architecture of one embodiment of the present invention.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The present invention, according to a preferred embodiment, overcomes problems with the prior art by providing multi-project buffer management for an efficient and easy-to-implement multi-project management system utilizing the critical chain methodology.

One advantage of the present invention is the calculation of task priorities while taking a multitude of factors into account, such as buffer priorities, the amount of buffer consumed by a task, chain lengths, maximum buffer consumption, the amount of the current chain that has been completed, amount of buffer recovered, and other factors. Another advantage of the present invention is the calculation of task priorities among multiple projects. Implementing the critical chain project management methodology in a multi-project environment requires multi-project buffer management. Thus, the present invention provides multi-project buffer management in order to provide task priorities across multiple projects. The calculation of task priorities across multiple projects allows managers to assign resources based on the overall need of all projects.

Yet another advantage of the present invention is online buffer management. It is beneficial for all buffer management related functions to be performed over the Web in a client-server environment, such as a project manager submitting a project over the Web. This eliminates the need for a project manager to create a project at a particular computer. It is further beneficial as execution processes can occur over the Web, such as the updating of task manager statuses and the submission of completed work. Additionally, it is beneficial for buffer management settings to be configured over the Web, eliminating the need for an administrator to sit at a particular workstation. Lastly, it is beneficial for buffer management reports to be viewed easily over a network. This allows a wider audience greater access to status and progress information.

The present invention, according to a preferred embodiment, further overcomes problems with the prior art by providing a user-friendly and efficient critical chain-based project management system utilizing a throughput measurements. This feature of the present invention provides the advantage of allowing for quick and easy generation of graphs or charts that visually indicate the throughput of a system, allows a user to breakdown throughput measurements by status and priorities, and allow the user to measure throughput at various levels of an organization. This allows a user, such as a manager or a division head, to identify when queues are building up, thereby creating longer wait times, and identify bottlenecks or opportunities to increase throughput of the system. This allows focused corrective actions to be taken at a local level.

FIG. 1 is a block diagram illustrating the client-server architecture of one embodiment of the present invention. The exemplary embodiments of the present invention adhere to the system architecture of FIG. 1. FIG. 1 shows an embodiment of the present invention wherein clients interact with a critical chain-based project management system over a network, such as in an enterprise implementation of the project management system that services multiple users in more than one location and for multiple projects. FIG. 1 shows client computers 106 through 108 connected to a network 104. It should be noted that although FIG. 1 shows only two client computers 106 and 108, the system of the present invention supports any number of client computers. FIG. 1 also shows a project management server system 102, which may be critical chain-based, connected to the network 104. The project management server system 102 is described in more detail with reference to FIG. 3 below.

In an embodiment of the present invention, the computer systems of client computers 106 through 108 and server system 102 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the client computers 106 through 108 and server system 102 are a server system, such as SUN Ultra workstations running a SunOS operating system or IBM RS/6000 workstations and servers running the AIX operating system. The computer systems of computers 106 through 108 and server system 102 are described in greater detail below with reference to FIG. 15.

In an embodiment of the present invention, the network 104 is a circuit switched network, such as the Public Service Telephone Network (PSTN). In another embodiment, the network 104 is a packet switched network. The packet switched network is a wide area network (WAN), such as the global Internet, a private WAN, a local area network (LAN), a telecommunications network or any combination of the above-mentioned networks. In yet another embodiment, the structure of the network 104 is a wired network, a wireless network, a broadcast network or a point-to-point network.

Figure 2:
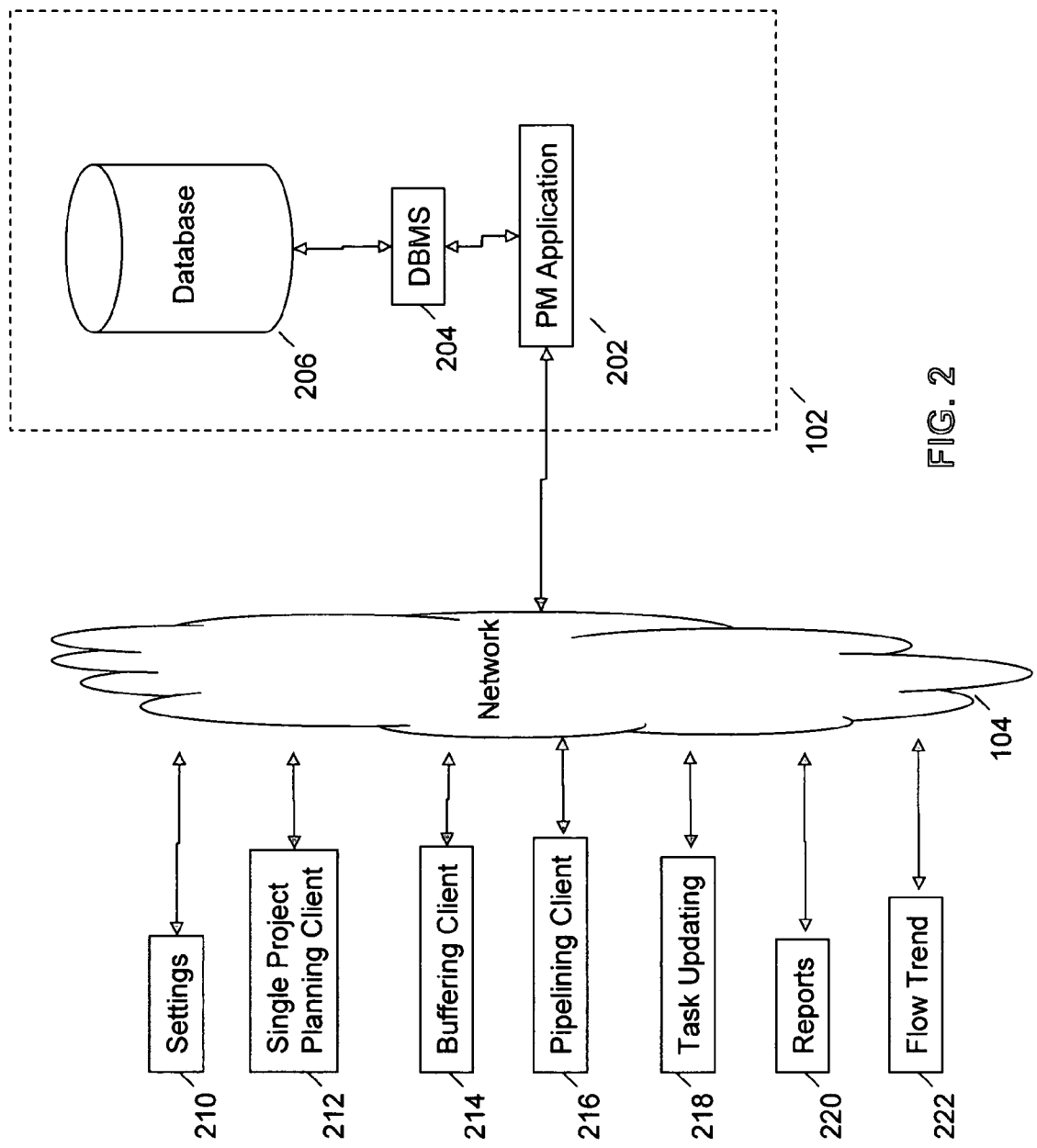
FIG. 2 is a more detailed block diagram illustrating the overall architecture of one embodiment of the present invention.

FIG. 2 is a more detailed block diagram illustrating the overall architecture of one embodiment of the present invention. FIG. 2 shows more detail regarding the client-server nature of the present invention, as shown in FIG. 1.

FIG. 2 shows the components of the project management server system 102, which may be critical chain-based, connected to the network 104. The project management server system 102 includes a database 206, a database management system 204 and a project management application 202. The database 206 is a repository for data used by project management application 202 during the course of the management of a project or projects. The database 206 includes all information necessary for performing the functions of the project management server system 102, including project planning, project execution, buffering, pipelining, task updating, etc. These functions are described in greater detail below. The database 206 also includes project setting information, user information, reports, and other information that is modified or accessed by the project management application 202 during the course of a project or projects. Database 206 can be any commercially database, such as an Oracle Database, Enterprise or Personal Edition, available from Oracle Corporation, or a Microsoft SQL Server or Access 2000 database available from Microsoft Corporation.

Database management system 204 is an application that controls the organization, storage and retrieval of data (fields, records and files) in database 206. The database management system 204 accepts requests for data from the project management application program 202 and instructs the operating system to transfer the appropriate data. Database management system 204 may also control the security and integrity of the database 206. Data security prevents unauthorized users from viewing or updating certain portions of the database 206. Database management system 204 can be any commercially database management system, such as the Oracle E-Business Suite available from Oracle Corporation.

FIG. 2 also shows the project management application 202, which performs substantially the functions of the present invention, as described in greater detail below. Project management application 202 connects directly to the network 104 via a network interface, such as a network interface card. Optionally, the project management server system 102 includes a Web server that connects to the network 104 via a network interface. The project management application 202 is logically connected to the Web server, which provides a Web interface available to clients (such as clients 106 through 108) of the project management server system 102. This option is advantageous as a Web interface allows any clients having a Web browser to connect to the project management server system 102. A Web interface provides a simple, efficient, highly compatible, economical and highly available connection to the project management server system 102 to a wide range of clients.

FIG. 2 further shows a group of clients for connecting to the project management server system 102. These clients include a single project-planning client 212, a buffering client 214, and a resource reconciliation client 216, otherwise known as a pipelining client 216. The single project planning client 212 allows a project manager to generate and submit a project plan to the project management server system 102. The buffering client 214 modifies a project plan to include a required set of buffers. The resource reconciliation client 216 processes all project plans and reconciles all resource conflicts in order to produce a master project plan. The resource reconciliation client 216, or pipelining client, performs cross-project or multiple project planning, as opposed to single project planning.

Single project planning client 212, the buffering client 214, and the resource reconciliation client 216 are client applications, such as C++, Visual Basic, Java applet, a Java scriptlet, Java script, Perl script, an Active X control or any self-sufficient application executing on a client computer. The clients of FIG. 2 can communicate with the project management server system 102 via a Web interface such as a commercially available Web browser, e.g., Netscape Navigator and Microsoft Internet Explorer. The functions of the single project planning client 210, the buffering client 214, and the resource reconciliation client 216 are described in greater detail below.

FIG. 2 further shows a settings module 210 for configuring the settings for the project management server system 102. Settings module 210 can be used to manage user and group accounts, manage user and group permissions and authorizations, set use policies, set system and Web interface parameters, modify configuration settings on the project management server system 102 and the like. Settings module 210 is a client application, such as an application programmed in C++, Visual Basic, a Java applet, a Java scriptlet, Java script, Perl script, an Active X control or any self-sufficient application executing on a client computer. The settings module 210 can communicate with the project management server system 102 via a Web interface such as a commercially available Web browser. Alternatively, the settings module 210 is a simple Web interface realized through a commercially available Web browser, wherein the user enters and/or modifies settings via a Web page.

FIG. 2 further shows a task-updating module 218, used by task managers to update the status of tasks and projects with the project management server system 102 during the course of a project or projects. The task-updating module 218 can be used to manage the creation and modification of task information for projects, before and during execution. The task-updating module 218 can further be used to update task statuses, forecast how much more time it will take to finish the task, modify task attributes, provide information on what may be holding up a task, and the like. The task updating module 218 is a client application, such as an application programmed in HTML or XML, a Java applet, a Java scriptlet, Java script, Perl script, an Active X control or any self-sufficient application executing on a client computer. The task-updating module 218 can communicate with the project management server system 102 via a Web interface such as a commercially available Web browser. Alternatively, the task-updating module 218 is a simple Web interface realized through a commercially available Web browser, wherein the user enters and/or modifies task information via a Web page. The functions of the task-updating module 218 are described in greater detail below.

FIG. 2 further shows a reports module 220, used by task and project managers to evaluate the status of a project or projects with the project management server system 102 during the course of a project or projects. The reports module 220 can be used to download various kinds of reports, such as progress chart and graphs, which can be used to evaluate the status of a project during execution. The reports module 220 is a client application, such as a Java applet, a Java scriptlet, Java script, Perl script, an Active X control, an application programmed in HTML or XML or any self-sufficient application executing on a client computer. The reports module 220 can communicate with the project management server system 102 via a Web interface such as a commercially available Web browser. Alternatively, the reports module 220 is a simple Web interface realized through a commercially available Web browser, wherein the user selects reports for download via a Web page.

FIG. 2 further shows a flow trend module 222, used by task and project managers to evaluate and measure the throughput of a project or projects within the project management server system 102 during the course of a project or projects. The flow trend module 222 can be used to download and/or generate various kinds of reports, such as charts, spreadsheets or graphs, which can be used to evaluate the throughput of a project during execution. The flow trend module 222 is a client application, such as a Java applet, a Java scriptlet, Java script, Perl script, an Active X control, an application programmed in HTML or XML or any self-sufficient application executing on a client computer. The flow trend module 222 can communicate with the project management server system 102 via a Web interface such as a commercially available Web browser. Alternatively, the flow trend module 222 is a simple Web interface realized through a commercially available Web browser, wherein the user selects reports for creation and/or download via a Web page.

It should be noted that in the embodiment of the present invention described above, the modules 210, 218, 220 and 222 and the clients 212, 214 and 216 are depicted as separate from the project management server system 102. In this embodiment, the modules 210, 218, 220 and 222 and the clients 212, 214 and 216 communicate with the computer system of the project management server system 102 over a network 104 or other communication medium. In an alternative embodiment of the present invention, any one or all of the modules 210, 218, 220 and 222 and the clients 212, 214 and 216 can be integrated with the computer system of the project management server system 102. In this alternative embodiment, those modules or clients that are integrated with the project management server system 102 share the same resources as the project management server system 102.

Figure 3:
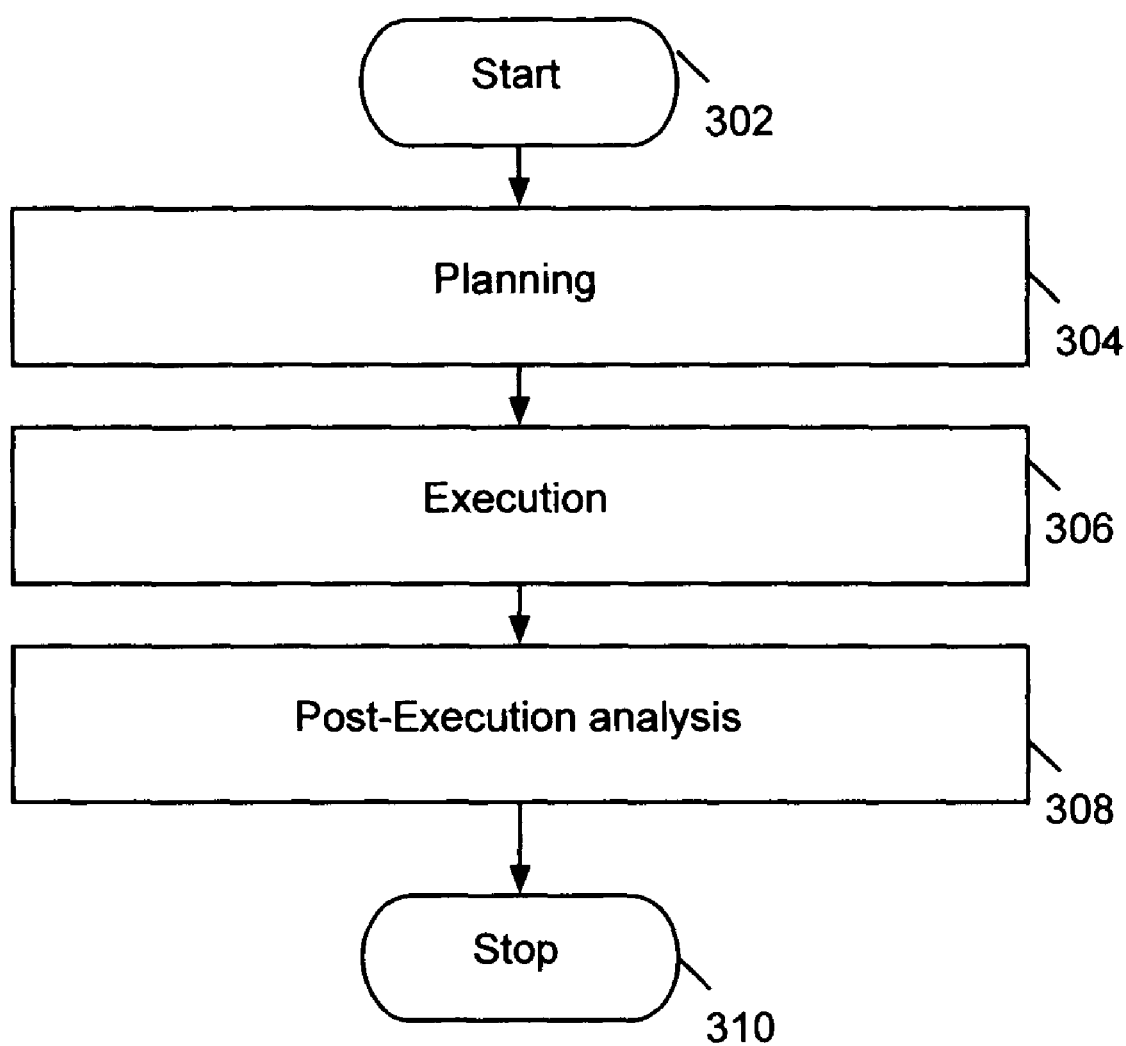
FIG. 3 is an operational flow diagram showing the overall project management process according to one embodiment of the present invention.

FIG. 3 is an operational flow diagram showing the overall project management process according to one embodiment of the present invention. FIG. 3 shows the three main phases of any project management process: the planning phase, the execution phase and the post-execution analysis phase. The operation and control flow of FIG. 3 begins with step 302 and proceeds directly to step 304.

In step 304, the pre-execution planning phase includes such functions as configuring settings, generating and submitting single projects, buffering of projects, multiple project planning, and other functions. Functions of the planning phase are described in more detail with reference to FIGS. 4 through 9 below. The pre-execution planning phase further includes a portfolio optimization function that allows high-level project planning. The portfolio optimization function calculates those project objectives that can be met with the available project resources. Conversely, portfolio optimization function can calculate the project resources necessary to meet those project objectives that are most desirable.

In step 306, the execution phase of the project management process includes the functions of buffer management, task updating, report generation and other functions. The functions of the execution phase are described in more detail with reference to FIGS. 10-14 below. Lastly, in step 308, the post-execution analysis phase includes a performance diagnostic function wherein project managers and other administrators can review the execution of the project or projects. The performance diagnostic function can be used to determine problem items, such as bottlenecks, or buffer-consuming tasks/projects, and to determine resource deficiencies of a project or projects. In step 310, the operational flow diagram of FIG. 3 stops.

Figure 4:
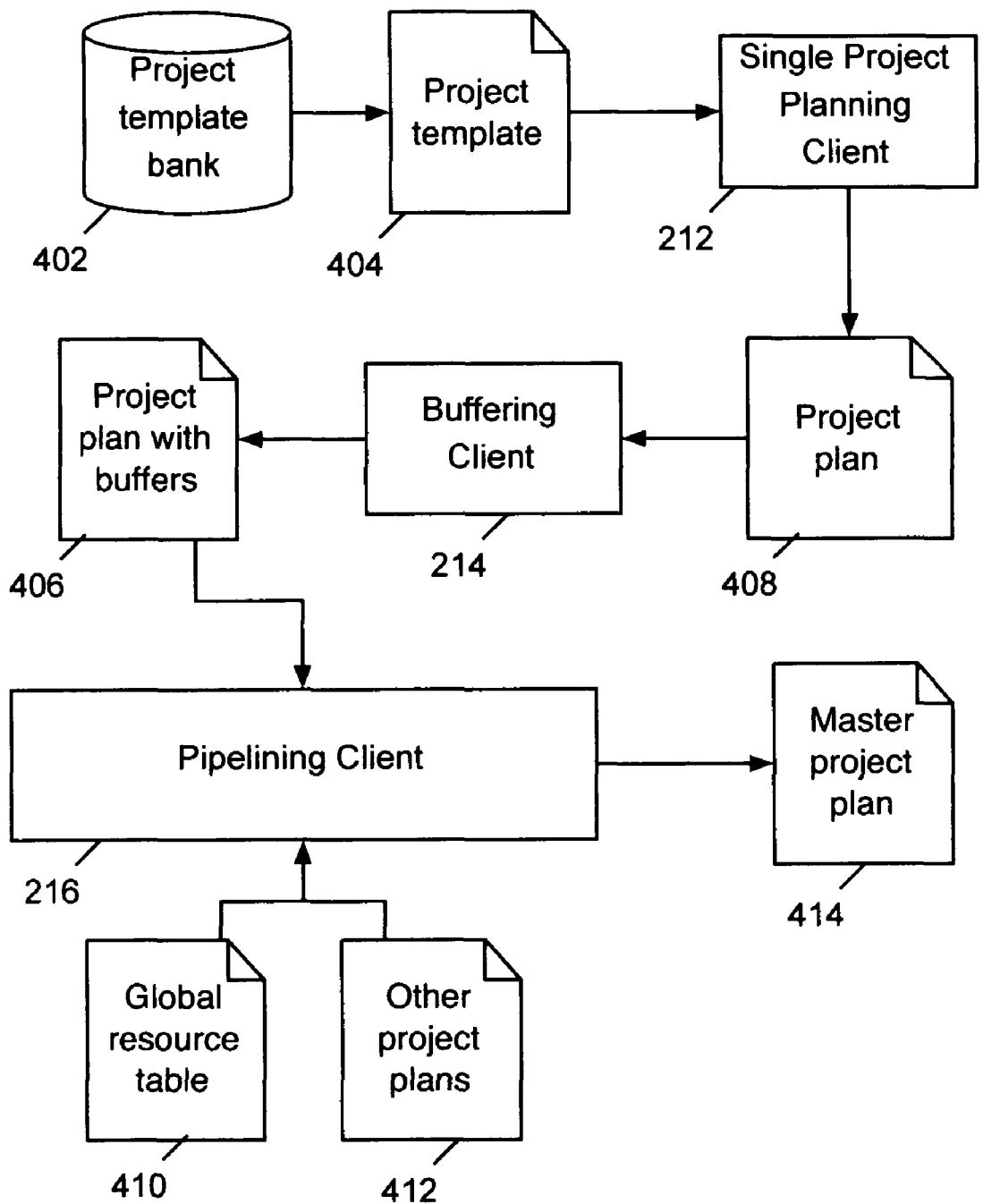
FIG. 4 is a block diagram illustrating the planning phase of the project management process according to one embodiment of the present invention.

FIG. 4 is a block diagram illustrating the planning phase of the project management process according to one embodiment of the present invention. FIG. 4 shows more detail of the pre-execution planning phase of step 304 of FIG. 3, including the functions of configuring settings, generating and submitting single projects, buffering of projects, multiple project planning, and other functions. FIG. 4 begins with the generation of a project plan by the single project-planning client 212.

In FIG. 4, the single project-planning client 212 accesses a project template 404 from a project template bank 402. A project template 404 is a template of a project plan, defined beforehand such that projects of similar type and/or scope need not be generated from scratch by a project manager. Project templates can be re-used among project managers in order to save time and resources. The project template bank 402 is a database or repository of project templates. In an embodiment of the present invention, the project template bank 402 can be any commercially database, such as an Oracle Database.

A project manager interacts with the single project-planning client 212 in order to generate a project plan 408 based on the project template 404 from the project template bank 402. The project plan 408 is then submitted to the project management system 102, for example, over the Web via a Web page or over the Internet via an email message. A project plan 408 is a map, table, chart or any other organization of information that shows the intended progression of a project from start to finish. In one embodiment of the present invention, Microsoft Project, a project management application available from Microsoft Corporation, is used as the single project-planning client 212 to create a project plan. In this embodiment, Microsoft Project, which does not utilize a critical chain-based project management methodology, is used in conjunction with a plug-in, API or standalone application that offers critical chain-based calculations for generating a project plan.

Figure 6:
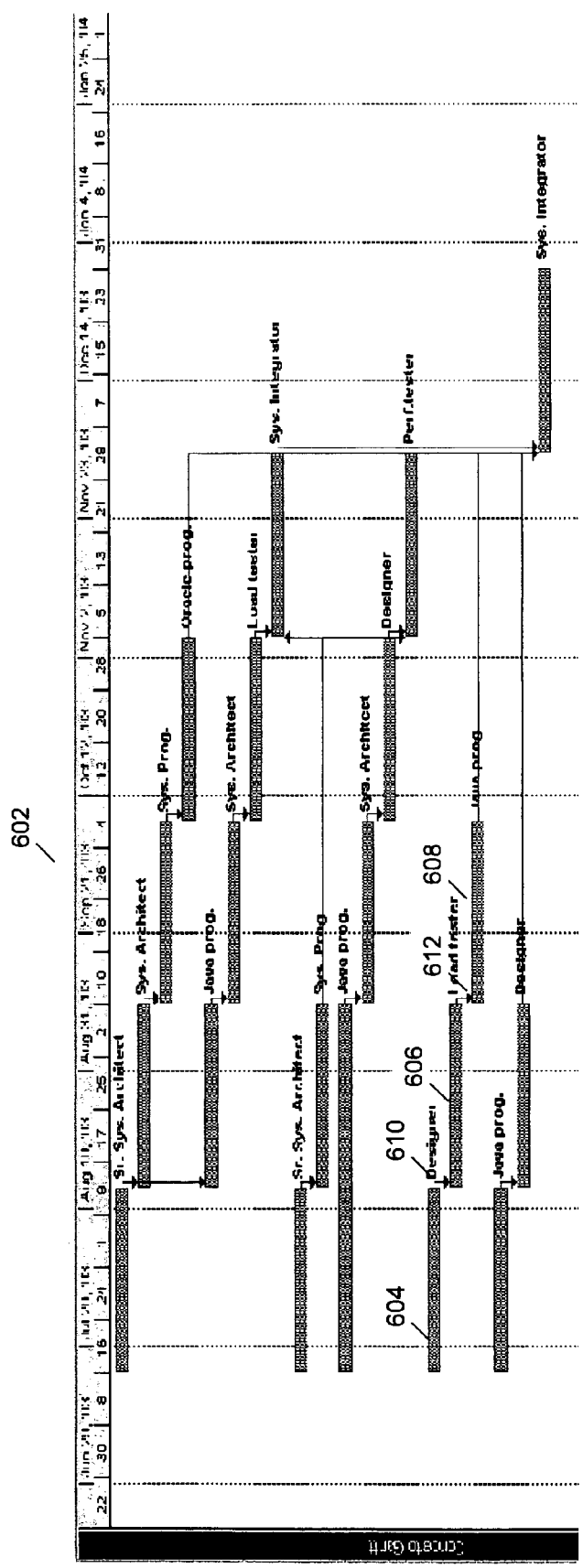
FIG. 6 is a screenshot of a graphic showing a project plan.

FIG. 6 is a screenshot of a graphic showing a project plan. FIG. 6 shows an example of a graphic depicting a project plan 402 generated using Microsoft Project. The graphic of FIG. 6 shows chronological dates along the top axis of the graphic 602. The project plan comprises individual tasks, shown as task blocks 604, 606 and 608 in the graphic. The length of each task block dictates the amount of time that is required to complete each task. Also shown are connecting lines, such as lines 610 and 612, which connect task blocks 604 and 606, as well as 606 and 608. These connecting lines show the interdependence of task blocks, such as the interdependence of task blocks 604 and 606. As depicted, the completion of task 606 depends on the completion of task 604.

Returning to FIG. 4, the generation of a project plan 408 by the single project-planning client 212 gives way to the buffering client 214, which inserts buffers into the project plan 408. The critical chain-based methodology of Goldratt (see bibliography above) teaches the use of various types of buffers that are used to protect time deadlines and budget goals in the event of uncertainties during project execution. Four types of buffers are used: project buffers located at the end of a project, feeding buffers located at the point at which one set of tasks or projects feeds into another set of tasks or projects, milestone buffers that are located at project milestones and project-to-project (or P2P) buffers that are located at points where one project feeds into another project. The buffering client 214 processes the project plan 408 and inserts the aforementioned buffers into the project plan 408, resulting in a project plan with buffers 406.

Figure 7:
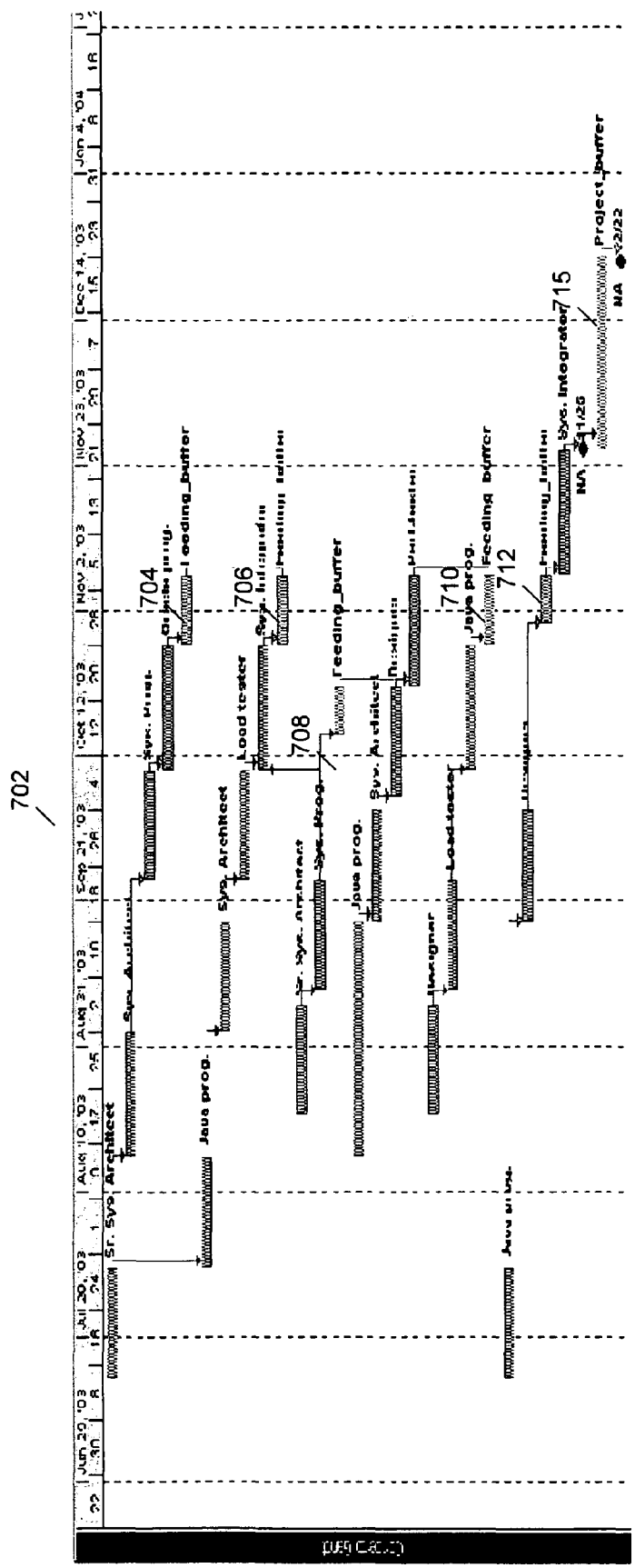
FIG. 7 is a screenshot of a graphic showing a project plan with buffers in one embodiment of the present invention.

FIG. 7 is a screenshot of a graphic showing a project plan with buffers in one embodiment of the present invention. FIG. 7 shows an example of a graphic depicting a project plan with buffers 406 generated using Microsoft Project. The graphic of FIG. 7 shows chronological dates along the top axis of the graphic 702. The project plan comprises individual tasks, shown as task blocks in the graphic. The length of each task block dictates the amount of time that is required to complete each task. Also shown are connecting lines that connect task blocks. These connecting lines show the interdependence of task blocks. FIG. 7 also shows examples of feeding buffers, 704, 706, 708, 710 and 712. Each of the feeding buffers is located at the end of a set of tasks that are being fed into another set of tasks. FIG. 7 also shows an example of a project buffer 715. The project buffer 715 is located at the end of the entire project, thus protecting the predicted finish for the entire project.

Returning to FIG. 4, the generation of a project plan with buffers 406 by the buffering client 214 gives way to the pipelining client 216, which processes all project plans and reconciles all resource conflicts in order to produce a master project plan 414. The pipelining client 216, or resource reconciliation client, performs cross-project or multiple project planning, as opposed to single project planning. The pipelining client 216 takes as input the project plan with buffers 406, generated by the buffering client 214. The pipelining client 216 also takes an input all other project plans 412 for the entire project, as well as a global resource table 410. The global resource table 410 is a complete set of resources that are available for the completion of all projects. Resources include man hours associated with workers, computing resources, raw materials, equipment, etc.

The pipelining client 216 performs a variety of functions, one of which is described with reference to FIG. 8. The pipelining client 216 allows a user to set a project completion date for one, more than one or all projects in a set of projects and provide the result of such date constraints on the over project plan. For example, see FIG. 8. FIG. 8 is a screenshot of a pipelining user interface 800 for date reconciliation in one embodiment of the present invention. The user interface 800 shows that a project "puma_02" has been selected from a set of sub-projects of a greater project, as shown in the text field 802. The user may enter a requested completion date of the sub-project "puma_02" into the text field 804. Once a date has been entered, the user may press the "Test Impact" button 806 to test the impact on the other sub-projects and the project as a whole of mandating the requested completion date entered by the user.

The impact is shown in the window 808, which lists all sub-projects and project data associated with each sub-project. For each sub-project the window 808 shows a variety of information such as the projected date of completion in column 810, the additional lateness of the date of completion in column 812, the cumulative lateness of the date of completion in column 814, and the buffer status in column 816. As the user presses the "Test Impact" button 806 to test the impact of mandating the requested completion date entered by the user, the pipelining client 216 performs calculations to determine the impact of such a mandate on the other sub-projects. Inevitably, as one sub-project is elevated in priority, other sub-projects are downgraded in priority. As a result, as the completion date of the sub-project "puma_02" is mandated, the projected date, or lateness of the other sub-projects may suffer. In this way, a project manager may modify sub-project priorities to reach the optimal combination of completion dates.

Figure 9:
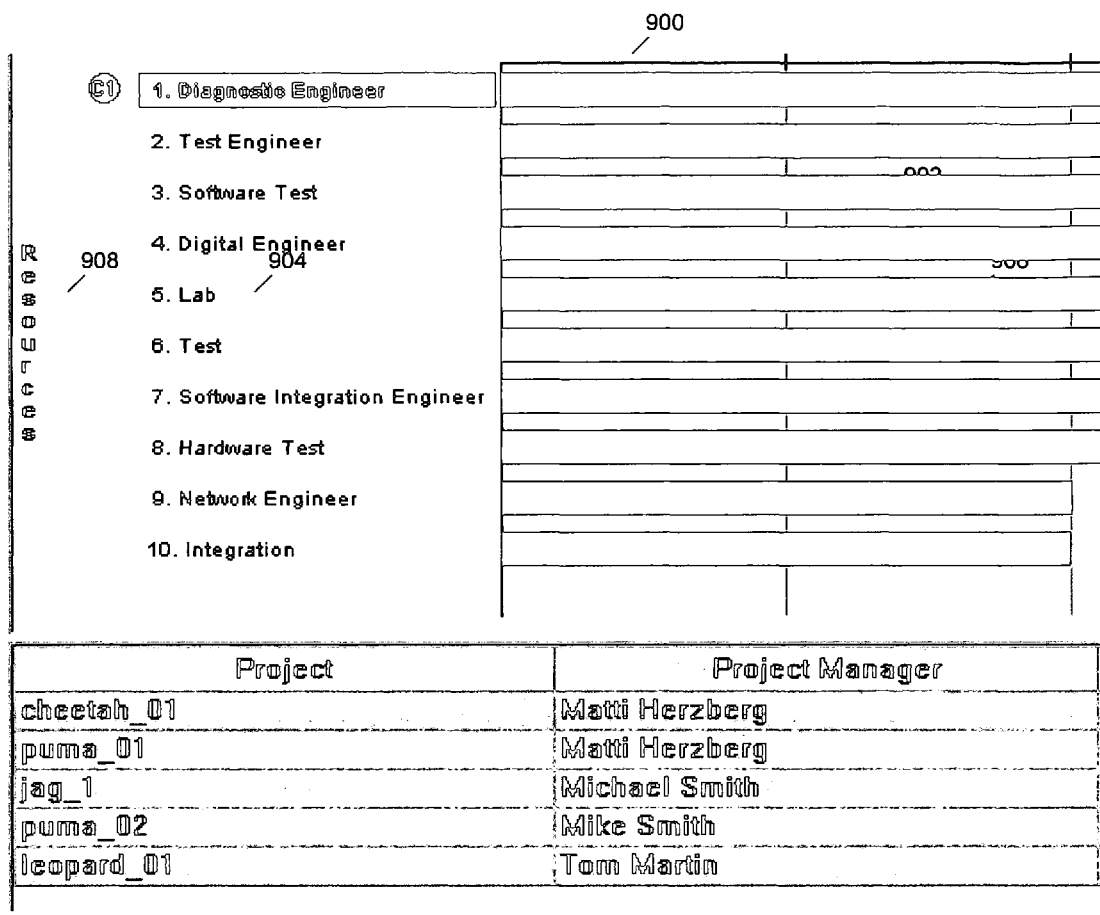
FIG. 9 is a screenshot of a pipelining user interface for resource reconciliation in one embodiment of the present invention.

Another function of the pipelining client 216 is described with reference to FIG. 9. The pipelining client 216 allows a user to set resource loads in order to meet time and budget goals. For example, see FIG. 9. FIG. 9 is a screenshot of a pipelining user interface 900 for resource reconciliation in one embodiment of the present invention. The user interface 900 shows a list of resources, such as the diagnostic engineer resource 904, on the bar chart 902 and the load on each resource is shown as the entire horizontal bar adjacent to a resource name, such as bar 906. A load is defined as the percentage of an available resource that is scheduled for use during a project. For example, if a worker is available for working a total of 2,000 man-hours in one year and the project schedules the worker for 1,000 man-hours worth of tasks for the year on the project, then the load on the worker is 50%.

Whereas the load on each resource is shown as the entire horizontal bar adjacent to a resource name, the red or dark portion of the bar indicates that portion of the resource that is scheduled on tasks that are part of the critical chain. According to the critical chain-based project management methodology, every project or set of projects has one critical chain of tasks/events that must be protected in order to realize established goals. The critical chain should be prioritized in order to maintain time and budget goals.

FIG. 9 shows that the diagnostic engineer resource 904 has been constrained, as indicated by an icon 908. To constrain means to normalize a resource to be loaded to a percentage below 100%. It may be that before the diagnostic engineer resource 904 was constrained, the resource was loaded to more than 100%. This occurs when the pipelining client 216 produces the resource load chart 902 based on a list of user objectives, wherein the objectives only took time goals, and not resource constraints, into account. Thus, the purpose of the pipelining client 216 is to reconcile resource constraints among the various sub-projects of a greater project. Once the diagnostic engineer resource 904 has been constrained to a load below 100%, the chart 902 shows that all other resources are also below 100% load. In this way, a project manager may adjust loads and objectives in order to reach the optimal combination of resource loads, objectives and completion dates.

Figure 5:
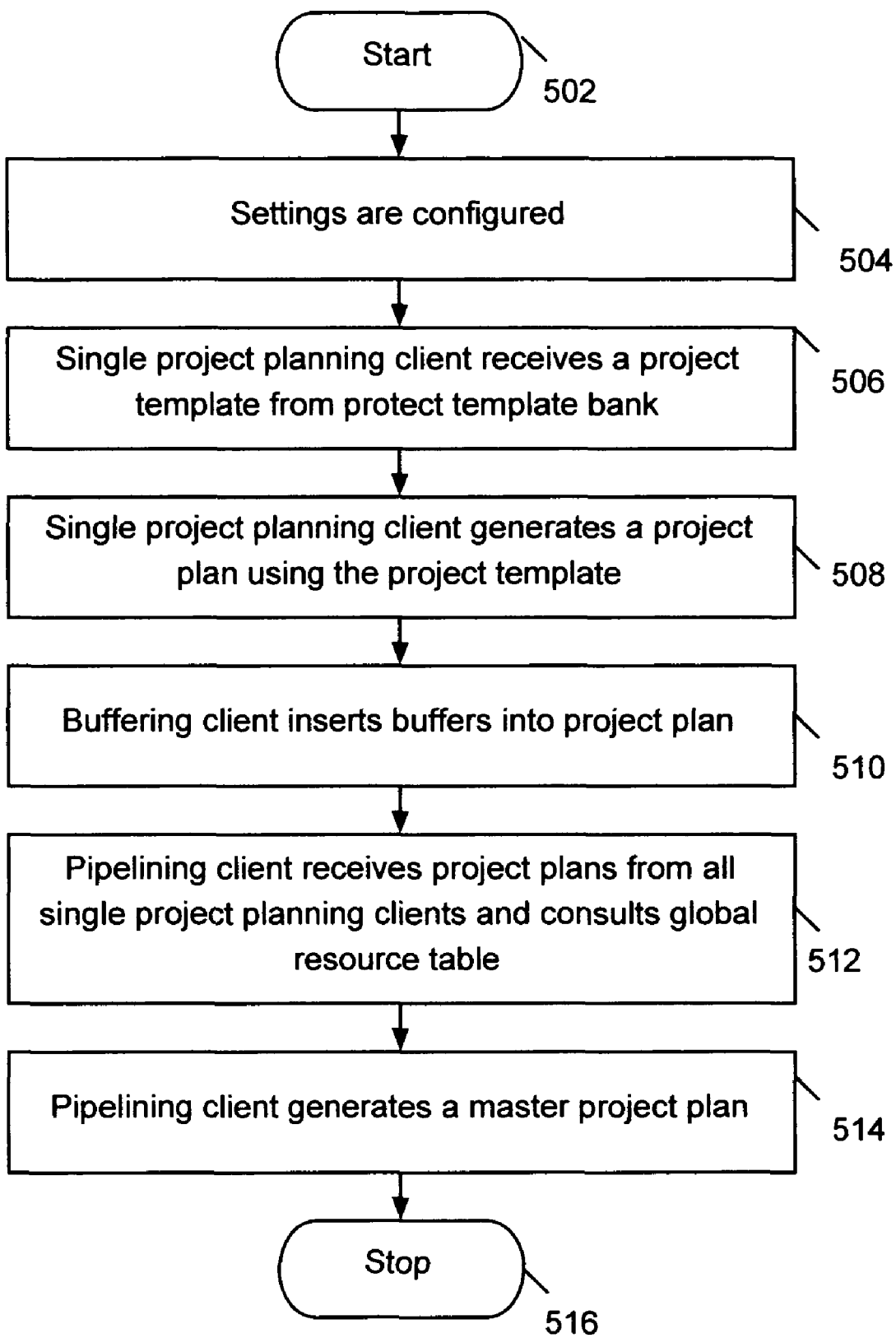
FIG. 5 is an operational flow diagram showing the planning phase of the project management process according to one embodiment of the present invention.

FIG. 5 is an operational flow diagram showing the planning phase of the project management process according to one embodiment of the present invention. FIG. 5 shows more detail of the planning phase of step 304 of FIG. 3, including the functions of configuring settings, generating and submitting single projects, buffering of projects multiple project planning, and other functions. FIG. 5 begins with step 502 and proceeds immediately to step 504.

In step 504, the settings of the project management server system 102 are configured by a user, such as a system administrator or a project manager. The settings module 210 can be used for configuring the settings of the project management server system 102. Settings module 210 can be used to manage user and group accounts, manage user and group permissions and authorizations, set use policies, set system and Web interface parameters, modify configuration settings on the project management server system 102 and the like. As explained above, the settings module 210 can be a simple Web interface realized through a commercially available Web browser, wherein the user enters and/or modifies settings via a Web page.

In step 506, the single project-planning client 212 accesses a project template 404 from a project template bank 402. A project template 404 is a template of a project plan, defined beforehand such that projects of similar type and/or scope need not be generated from scratch by a project manager. In step 508, a project manager interacts with the single project-planning client 212 in order to generate a project plan 408 based on the project template 404 from the project template bank 402. A project plan 408 is a map, table, chart or any other organization of information that shows the intended progression of a project from start to finish. The generation of a project plan 408 by the single project planning client 212 gives way to the buffering client 214, which inserts buffers into the project plan 408 in step 510. The buffering client 214 processes the project plan 408 and inserts a variety of buffers into the project plan 408, resulting in a project plan with buffers 406.

The generation of a project plan with buffers 406 by the buffering client 214 gives way to the pipelining client 216, which processes all project plans and reconciles all resource conflicts in step 512. The pipelining client 216, or resource reconciliation client, performs cross-project or multiple project planning, as opposed to single project planning. The pipelining client 216 takes as input the project plan with buffers 406, generated by the buffering client 214. The pipelining client 216 also takes an input all other project plans 412 for the entire project, as well as a global resource table 410. The global resource table 410 is a complete set of resources that are available for the completion of all projects The result of the pipelining client 216 is a master project plan 414, in step 514. In step 516, the operational flow of FIG. 5 stops.

Critical chain-based project management methodology includes two main components: the placement of buffers in the correct locations of a project plan and using the status of these buffers during execution to decide what tasks to focus on. This second component is called buffer management. The main idea of buffer management is that the rate at which buffers are depleting is monitored and priority is given to tasks that lie on chains where buffers are fast depleting. In a multi-project environment, however, this simplistic idea is difficult to implement Project employees often work on multiple projects at the same time, and hence need not only task priorities within a project, but also across projects. This is a complex problem as comparing tasks among different projects is like comparing apples to oranges: some projects have higher strategic priorities, certain milestones in a project that need to be delivered first and individual projects have different amounts of buffer placed in their project plans. This is compounded by the fact that project employees are often located in different places.

The present invention provides multi-project buffer management that allows organizations to use buffer management in a complex environment, where resources are shared across projects. Task priorities are driven by a combination of relative project priority, relative milestone priority and buffer consumption by each task, requiring a complex set of algorithms. The buffer management process is further Web enabled so that project managers can configure buffering policies over the Web, submit project plans with buffers over the Web, do task updates over the Web, run buffer management functions using the Web, and acquire buffer reports over the Web. Current critical chain-based project management solutions lack the capability of multi-project buffer management, and only have capability for a single project buffer management and thus at best work only when resources are dedicated to one project.

Figure 10:
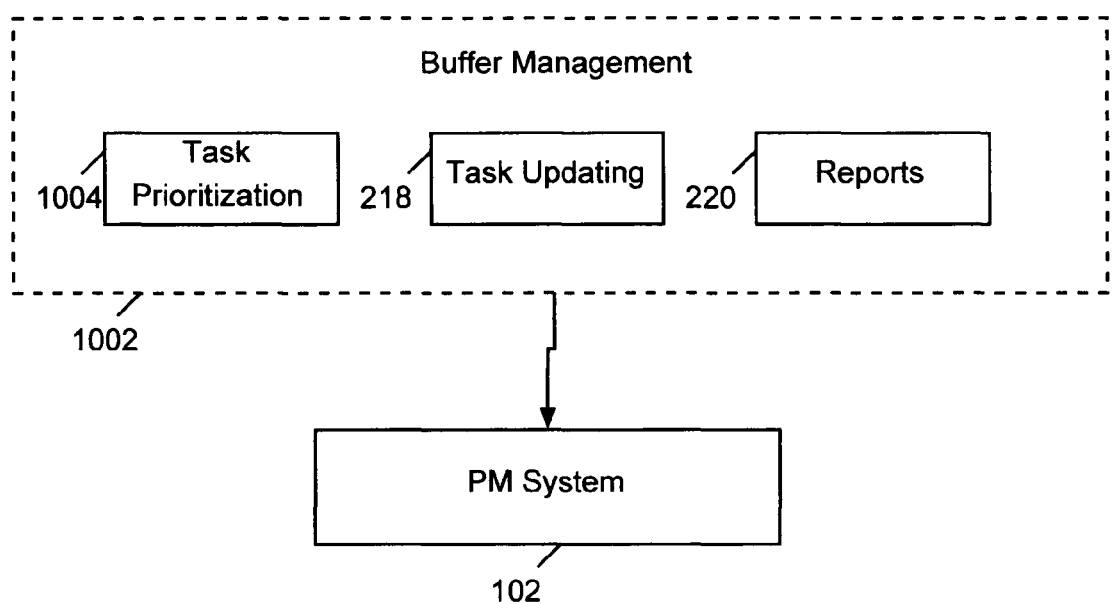
FIG. 10 is a block diagram illustrating the execution phase of the project management process according to one embodiment of the present invention.

FIG. 10 is a block diagram illustrating the execution phase of the project management process according to one embodiment of the present invention. FIG. 10 shows more detail of the execution phase of step 306 of FIG. 3, including the functions of buffer management, task updating, task prioritization, report review and other functions. FIG. 10 shows that the buffer management process 1002 comprises three components, task updating (as performed by task updating module 218), report review (wherein reports are provided by reports module 220) and task prioritization (as performed by task prioritization module 1004).

FIG. 10 shows the updating of task statuses via the task-updating module 218. The task-updating module 218 is used by task managers to update the status of tasks and projects with the project management server system 102 during the course of a project or projects. The task-updating module 218 can be used to manage the creation and modification of task information for projects, before and during execution. The task-updating module 218 can further be used to update task statuses, forecast how much more time it will take to finish the task, modify task attributes, provide information on what may be holding up a task, and the like. As explained above, the task updating module 218 can be a simple Web interface realized through a commercially available Web browser, wherein the user enters and/or modifies task information via a Web, page.

Figure 11:
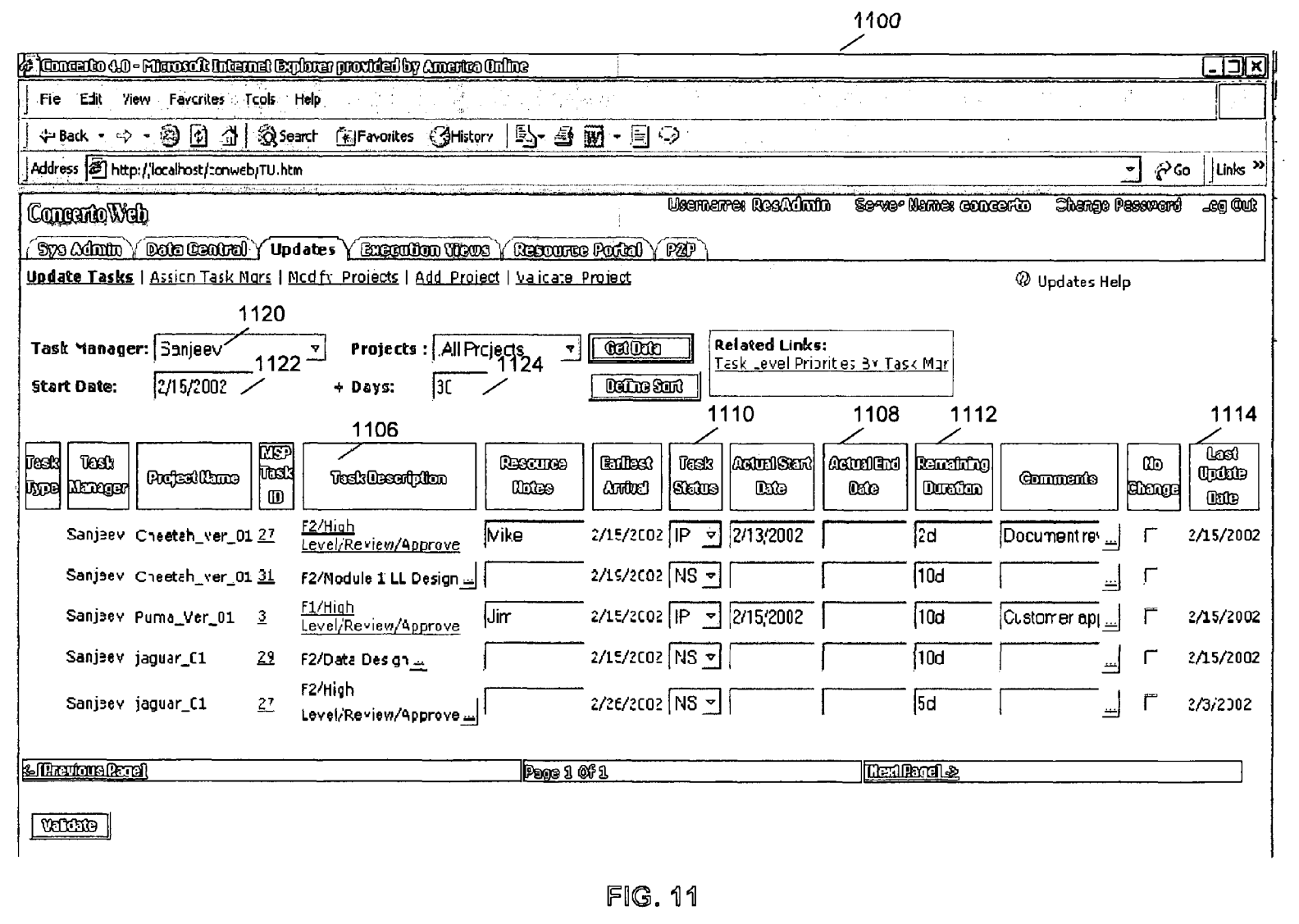

The task-updating module 218 performs a variety of functions, one of which is described with reference to FIG. 11. FIG. 11 is a screenshot of a task updating user interface 1100 in one embodiment of the present invention. The user interface 1100 can be realized as a Web page accessible over the Web by a Web browser. The user interface 1100 shows all tasks for a particular task manager, as indicated in text field 1120, starting on a particular date, as indicated in text field 1122, and for a specified period of time, as indicated in text field 1124. The aforementioned text fields allow for different views of information by selecting various selections in the aforementioned text fields, such as selecting a different task manager in the text field 1120.

The user interface 11100 shows a list of tasks and, for each task, a task description in column 1106, a task earliest completion date in column 1108, a task status in column 1110, a remaining duration for the task in column 1112 and a last update date in column 1114. As task managers administer the progress of their respective tasks, they can access the user interface 1100 and update certain pieces of information, such as a task status in column 1110 and a remaining duration for the task in column 1112. This information is then used during the execution of the project to determine the status of the project.

Returning to FIG. 10, also shown is the reports module 220 for the generation and/or download of reports during execution of the project. The reports module 220 is used by task and project managers to evaluate the status of a project or projects of the project management server system 102 during the course of a project or projects. The reports module 220 can be used to download various kinds of reports, such as progress chart and graphs, which can be used to evaluate the status of a project during execution. Examples of chart and graphs that may be downloaded using the reports module 220 are provided below. As explained above, the reports module 220 can be a simple Web interface realized through a commercially available Web browser, wherein the user enters and/or modifies task information via a Web page.

Figure 12:
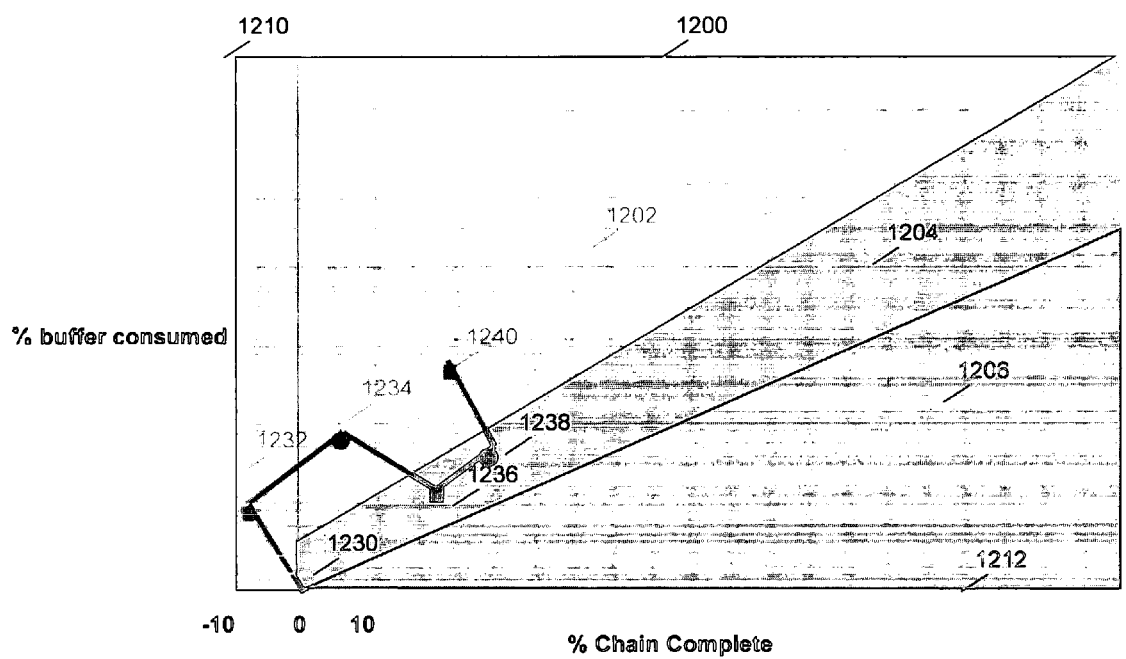
FIG. 12 is an illustration of a project status graph report in one embodiment of the present invention.

FIG. 12 is an illustration of a project status graph report 1200 in one embodiment of the present invention. In an embodiment of the present invention, the project status graph report 1200 can be accessed via a Web page over the Web using a Web browser. The graph 1200 depicts the progress of the project showing % buffer consumed on the y-axis 1210 and % chain complete on the x-axis 1212. The red area 1202 of the graph 1200 indicates that the progress of the project is hampered, the yellow area 1204 of the graph 1200 indicates a warning with regards to the progress of the project and the green area 1206 of the graph 1200 indicates that the progress of the project is occurring as planned. The algorithms of the present invention calculate the current status of the project and plot a point on the graph 1200 representing the current status. The algorithms used to calculate % buffer consumed on the y-axis 1210 and % chain complete on the x-axis 1212 are described in greater detail below.

Graph 1200 shows six points of reference for the project shown in the graph 1200. Each point marks a place in time in which the progress of the project is plotted. Point 1230 is the first point, marking the beginning of the project. Point 1232 is the second point, showing a setback in the project wherein the % chain complete moved to the negative area and the % buffer consumed has increased. This is due to an instance where the chain upon which the % chain complete calculation is based has increased in length, often due to project uncertainties during project execution. The third point, point 1234, shows that progress has been made toward completing the chain, but that the % buffer consumed has also increased, placing the point 1234 in the red area 1202.

The fourth point, point 1236, shows that progress has been made toward completing the chain, and that the % buffer consumed has decreased, placing the point 1236 in the yellow area 1204. This shows a buffer gain due to, for example, the early completion of tasks. The fifth point, point 1238, shows that progress has been made toward completing the chain, but that the % buffer consumed has also increased, placing the point 1238 in the yellow area 1204. The sixth point, point 1240, shows that progress has reversed toward completing the chain, and that the % buffer consumed has also increased, placing the point 1240 in the red area 1202. Once again, this may be due to an instance where the chain upon which the % chain complete calculation is based has increased in length, often due to project uncertainties during execution.

In one example, the % chain complete of the x-axis 1212 is calculated as:

$$\% \text{ chain complete} = (\text{original critical chain duration} - \text{remaining duration of the longest chain})/\text{original critical chain duration}$$

Original critical chain duration is the time needed to complete the longest chain of tasks including planned availability of resources. The remaining duration of the longest chain is the time needed to finish the longest remaining chain of tasks including planned availability of resources at the current time in the project history.

In another example, the % chain complete of the x-axis 1212 is calculated differently for milestone chains, wherein a chain of tasks/projects leads to a project milestone, and feeding chains, wherein a chain of tasks/projects feeds into another set of tasks/projects. In this example, the % chain complete of the x-axis 1212 is calculated as:

$$\% \text{ chain complete} = (\text{original duration of longest path including activity and resource dependencies on critical chain} - \text{remaining duration of the longest path including activity and resource dependencies on critical chain})/\text{original duration of longest path including activity and resource dependencies on critical chain}$$

This calculation takes into account the fact that chains feeding into milestones often change continuously. To account for this phenomena, the milestone chain includes activity dependencies and only resource dependencies on the critical chain.

In another example, the % buffer consumed of the y-axis 1210 is calculated by calculating the consumption of the project buffer by the chain feeding into the buffer. If there are multiple chains feeding into the project buffer, the worst value is taken. Since a project buffer can be consumed by any chain of activities and resource dependencies that are linked to this buffer, the % buffer consumed calculation considers the status of the worst chain (which translates into the highest buffer penetration of all chains feeding into the buffer).

The algorithms of the present invention used to calculate the current status of the project on graph 1200 are advantageous as they take into account the various buffers of the multiple projects and the percentage completed of the multiple projects. This provides a truer representation of the progress of a project, as opposed to viewing only data with respect to one of many projects.

Returning to FIG. 10, also shown is the provision of task prioritization 1004 during execution of the project. Task prioritization 1004 is a process of the present invention whereby task priorities over multiple projects are calculated. The present invention calculates the task priority for every task of the multitude of projects and thus provides a true multi-project task priority, as the calculation is based on multiple factors such as relative project priority, relative buffer priority, buffer consumption rates and other factors. The calculation of task priorities across multiple projects allows managers to see a complete picture of the entire project and thus see the true priority of a particular task. The calculation of a task priority for a single project shows only a partial priority of a particular task. The method in which task priorities are calculated is described in more detail with reference to FIG. 14 below.

Figure 13A:
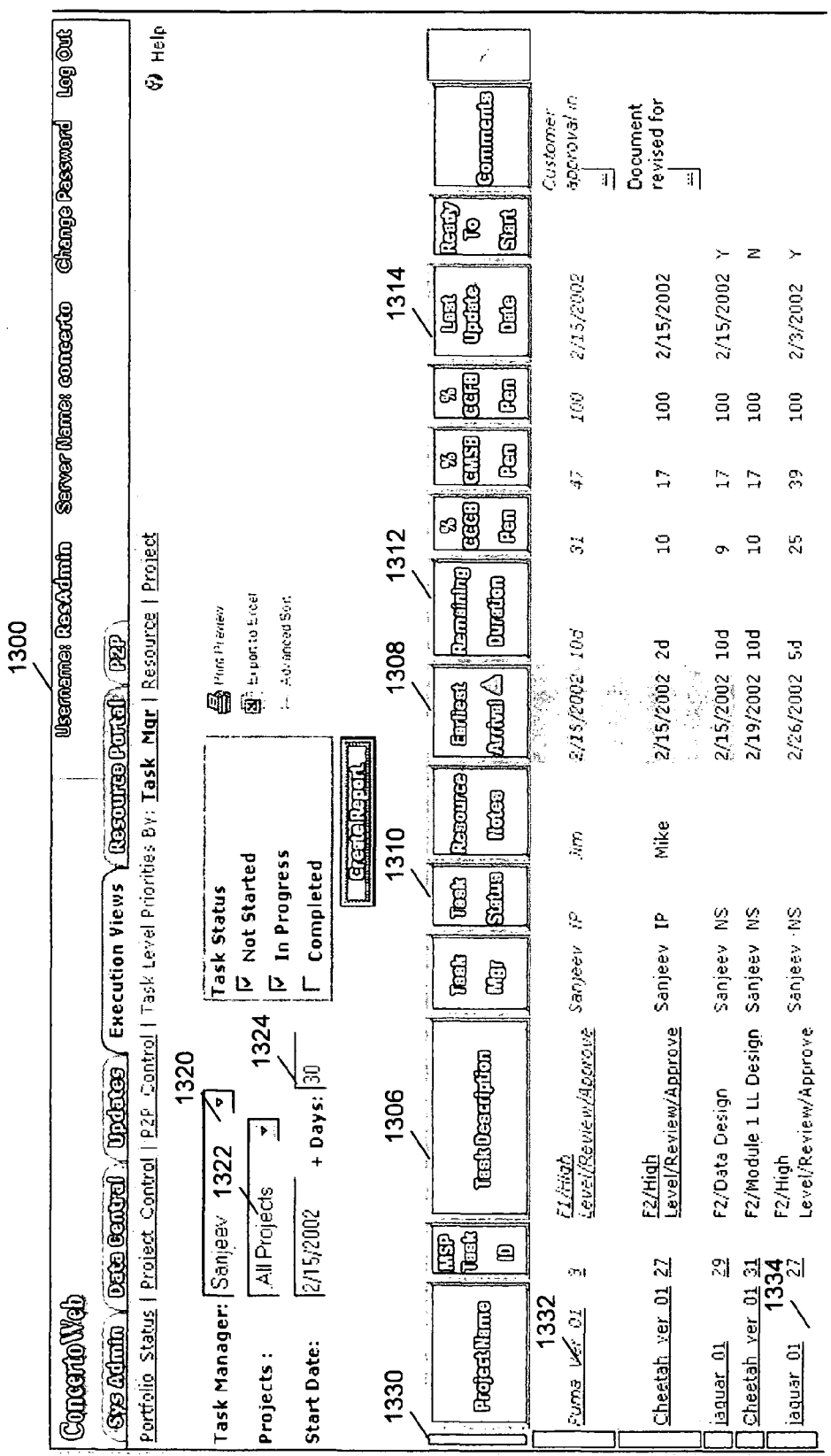
FIG. 13A is a screenshot of a first task prioritization user interface in one embodiment of the present invention.

FIG. 13A is a screenshot of a first task prioritization user interface 1300 in one embodiment of the present invention. The user interface 1300 can be realized as a Web page accessible over the Web by a Web browser. The user interface 1300 shows all tasks for a particular task manager, as indicated in text field 1320, starting on a particular date, as indicated in text field 1322, and for a specified period of time, as indicated in text field 1324. The aforementioned text fields allow for different views of information by selecting various selections in the aforementioned text fields, such as selecting a different task manager in the text field 1320.

The user interface 1300 shows a list of tasks and, for each task, a task description in column 1306, a task earliest arrival date in column 1308, a task status in column 1310, a remaining duration for the task in column 1312 and a last update date in column 1314. The user interface 1300 also shows a task priority column 1330 for identifying the priority of the tasks Priority in column 1330 is shown by color. High priority tasks are shown as red, while low priority tasks are shown as green. A review of the user interface 1300 shows that the first task 1332 is high priority as the task priority in column 1330 is marked as red. The user interface 1300 also shows that the upcoming task 1334 is high priority as the task priority in column 1330 is also marked as red. The method in which task priorities are calculated is described in more detail with reference to FIG. 14 below.

As task managers administer the progress of their respective tasks, they can access the user interface 1300 and determine the most important tasks to complete, i.e., those tasks that have the greatest effect on the time and budget goals of the project. This information is then used during the execution of the project to determine where manpower and resources should be allocated.

Figure 13B:
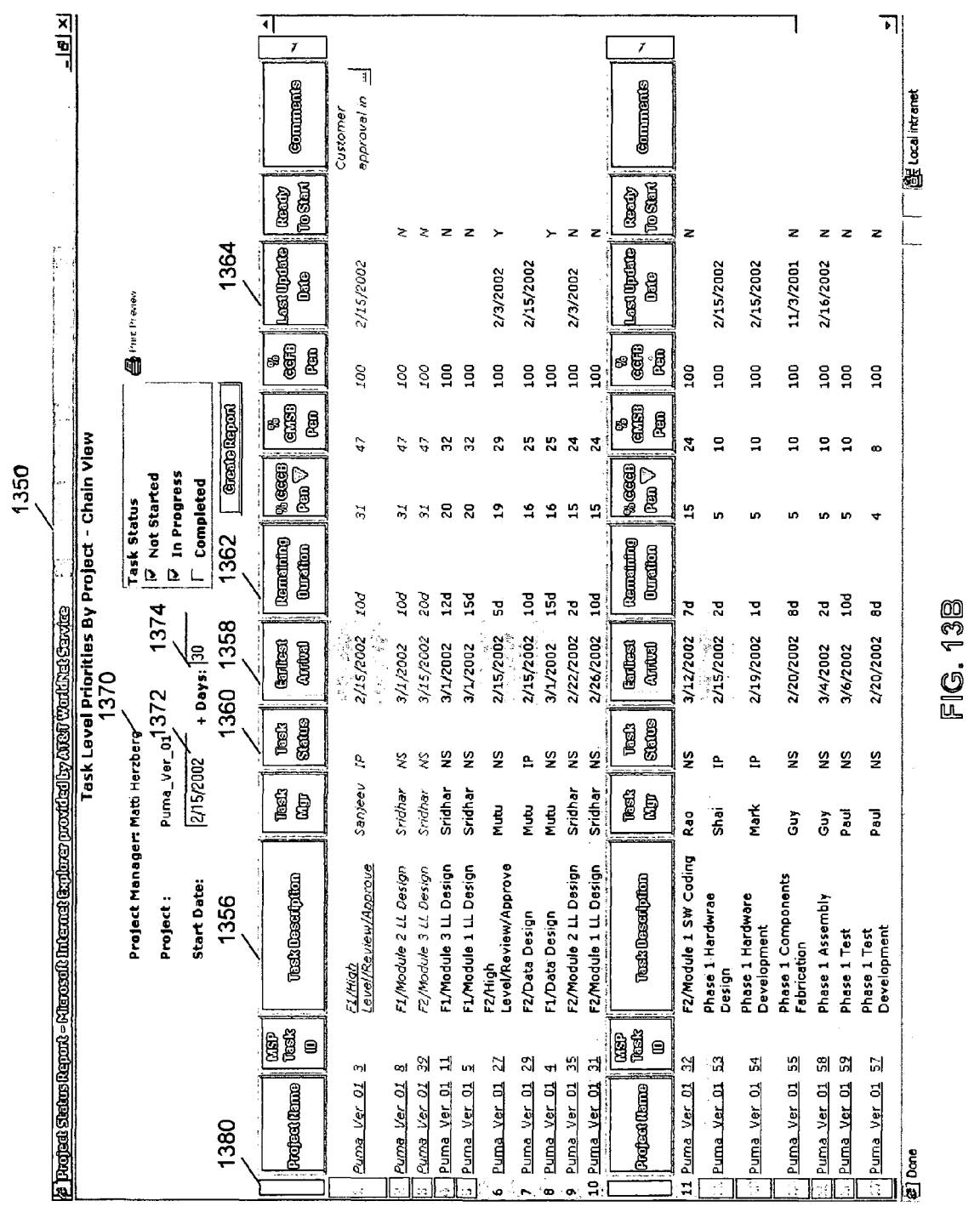

FIG. 13B is a screenshot of a second task prioritization user interface 1350 in one embodiment of the present invention. The user interface 1350 can be realized as a Web page accessible over the Web by a Web browser. The user interface 1350 shows all tasks for a particular project manager, as indicated in text field 1370, starting on a particular date, as indicated in text field 1372, and for a specified period of time, as indicated in text field 1374. The aforementioned text fields allow for different views of information by selecting various selections in the aforementioned text fields, such as selecting a different project manager in the text field 1370.

The user interface 1350 shows a list of tasks and, for each task, a task description in column 1356, a task earliest arrival date in column 1358, a task status in column 1360, a remaining duration for the task in column 1362 and a last update date in column 1364. The user interface 1350 also shows a task priority column 1380 for identifying the priority of the tasks. Priority in column 1380 is shown by color. High priority tasks are shown as red, medium priority tasks are shown as yellow and low priority tasks are shown as green. A review of the user interface 1350 shows that the first four tasks are high priority as the task priority in column 1380 is marked as red for all four. The method in which task priorities are calculated is described in more detail with reference to FIG. 14 below.

As project managers administer the progress of their respective tasks, they can access the user interface 1350 and determine the most important tasks to complete, i.e., those tasks that have the greatest effect on the time and budget goals of the project. This information is then used during the execution of the project to determine where manpower and resources should be allocated.

Figure 14:
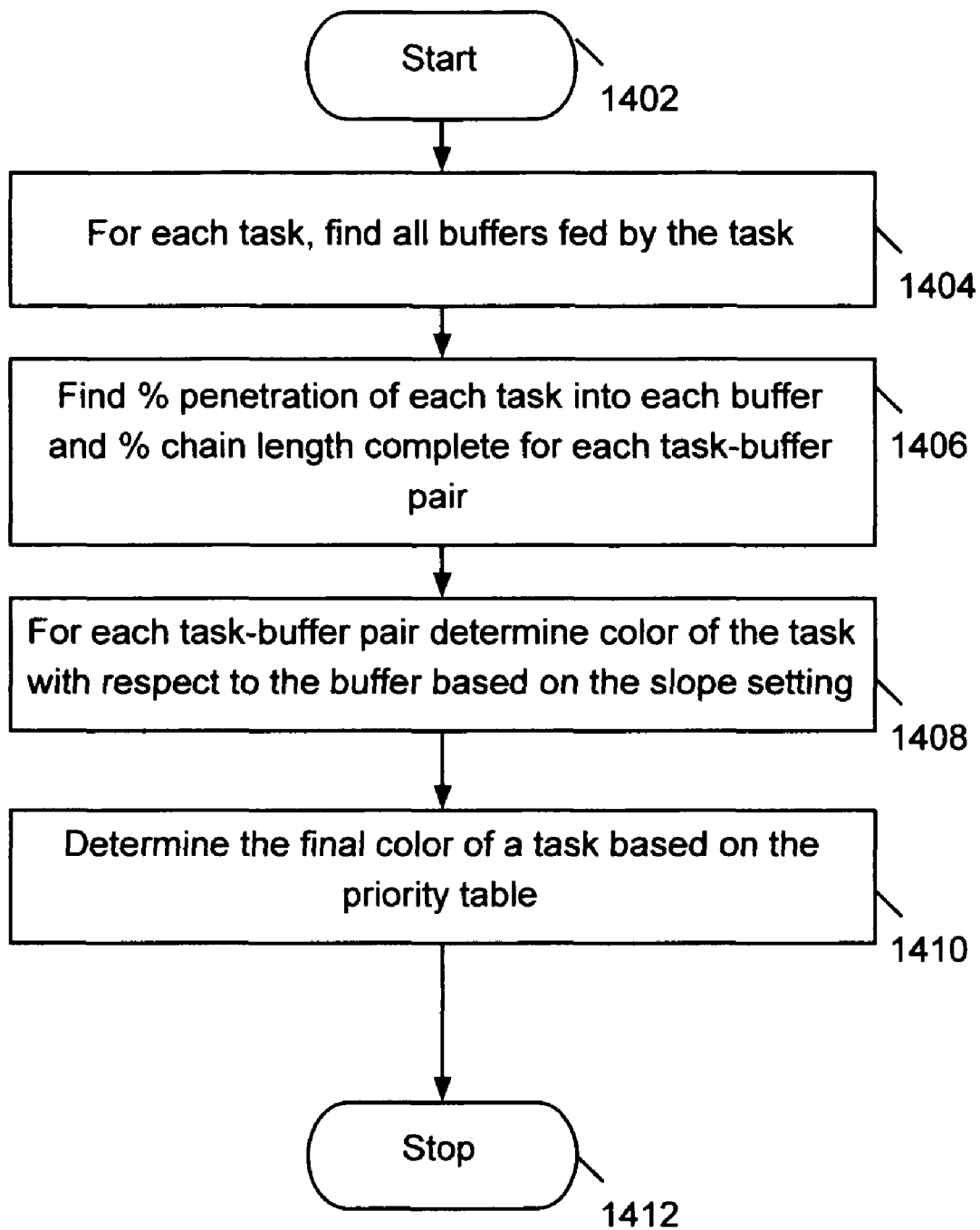
FIG. 14 is an operational flow diagram showing the task prioritization calculation process according to one embodiment of the present invention.

FIG. 14 is an operational flow diagram showing the task prioritization calculation process according to one embodiment of the present invention. FIG. 14 shows the method in which task priorities are calculated for the task priority columns 1330 and 1380 for FIGS. 13A and 13B, respectively. The operation and control flow of FIG. 14 begins with step 1402 and proceeds directly to step 1404.

In step 1404, for each task, all buffers fed by each task are identified. In other words, all task-buffer pairs are identified. In step 1406, the percent of penetration of each task into a buffer into which it feeds is calculated. I.e., the buffer penetration of each task-buffer pair is calculated. The percent of buffer penetration of any task-buffer pair is equal to the percent of buffer penetration of the chain to which the corresponding task belongs, into the buffer of the task-buffer pair. If the task of the task-buffer pair belongs to multiple chains, the worst buffer penetration value is taken. Also in step 1406, the percent chain length complete for each task-buffer pair is calculated. Note that this calculation takes the percent chain length complete of the longest chain that has one endpoint at the buffer and contains the task.

In step 1408, for each task-buffer pair, the color of the task with respect to the buffer is calculated, based on the slope setting. In other words, for each task-buffer pair, the color of the task on the graph 1200 of FIG. 12 is calculated. In step 1410, the final color of each task is calculated based on a buffer type priority table that maps priority to colors The buffer priority table, which may be user defined, defines the color (red, yellow or green) that corresponds to each priority type. In step 1412, the operational flow diagram of FIG. 14 stops.

Figure 16:
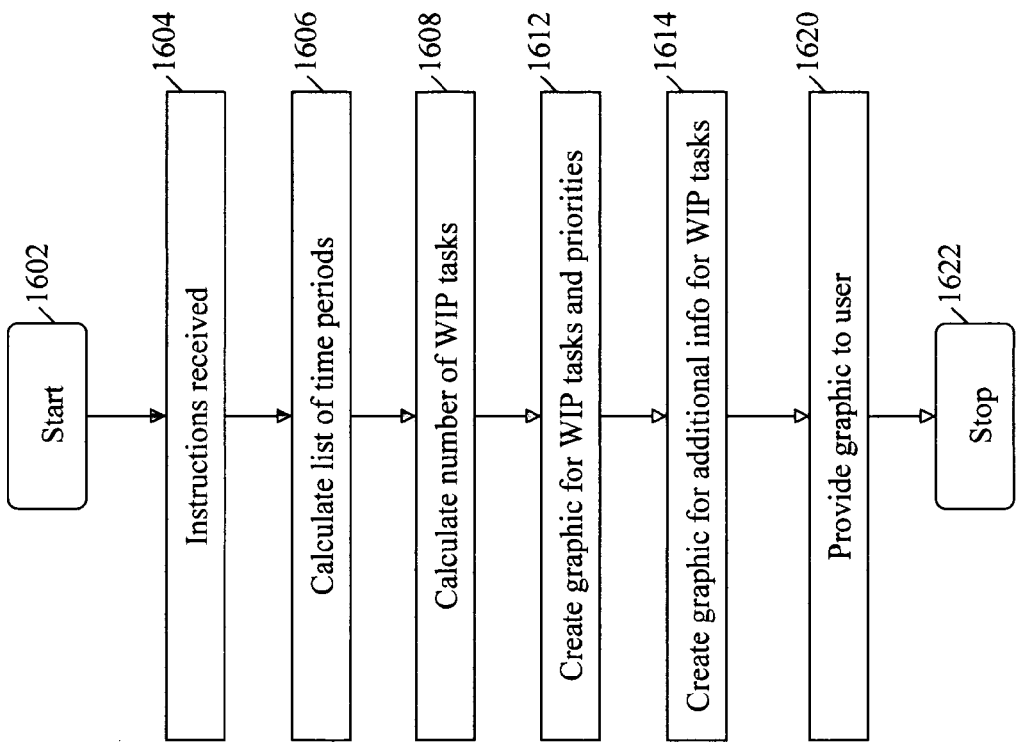
FIG. 16 is an operational flow diagram showing the throughput measurement graphic generation process according to one embodiment of the present invention.

FIG. 16 is an operational flow diagram showing the throughput measurement graphic generation process according to one embodiment of the present invention. The operation and control flow of FIG. 16 begins with step 1602 and proceeds directly to step 1604.

In step 1604, the project management server system 102 receives instructions for creating a graphic for measuring throughput in an ongoing project or projects. The instructions may be received via the flow trend module 222, which in turn can receive the instruction from a user or a pre-programmed entity. The instructions can comprise specifications on the throughput measurements desired, such as the particular project or projects, the particular priority, the particular division, the particular business unit, the particular customer, the particular portfolio, the particular project manager, the particular task manager, the particular task status, the particular resource manager, and a particular resource.

A division is a segment of a company or business association executing a project or projects. A business is a sub-segment of a company or business association executing a project or projects. A task priority is the importance level, i.e., priority, (such as low, medium or high) of a task. A customer is a company or individual for which a project or projects is executed. A portfolio is a conglomeration of units or segments of a company or business that are involved in a particular project or projects. A project manager is a manager that is placed in charge of a particular project, while a task manager is a manager that is placed in charge of a particular task. A resource is an expendable or fungible item that is utilized for a task or tasks of a project or projects, while a resource manager is a manager that is placed in charge of a particular resource.

A task status is a task attribute that can be either 1) a task in-progress, i.e., a task that has already begun (also known as a task IP for "In-Progress") or 2) a pending task, i.e., a task that has not already begun (also known as a task NS for "Not Started"). IP tasks or NS tasks that are expected to start in the current time period are referred to as WIP Tasks ("Work in Process") for that time period. A trend of the Work In Process tasks along with the priority of the task is an excellent indicator of throughput. For example, an increasing trend in WIP tasks for a selected resource or task manager indicates that too much work is being planned, A trend of WIP changing from low to high priority, i.e., from green to red, indicates that the work is getting delayed or stuck at a particular resource or task manager. The instructions received by the project management server system 102 for creating a graphic for measuring throughput in an ongoing project or projects can also comprise specifications pertaining to a graphic for depicting the throughput measurements desired. For example, the instructions may define the entire time period for which measurements are desired, the number of sub-periods into which the entire time period shall be divided, the duration of each time period, and the colors to use for the graphic.

In step 1606, the project management server system 102 generates a list of time periods for a specific project or projects. The list of time periods can be a chronological list of time periods, wherein each time period can be a day, a week, a month, a year or any other discernable period of time. The total era of time represented by the list of time periods can encompass: 1) a specific segment of the lifetime of a project or projects, 2) the total lifetime of a project or projects, or 3) a time-span extending from the beginning of a project or projects to a point in time before the end of the project or projects. The duration of time represented by each time period of the list of time periods can be uniform.

In step 1608, for each time period of the list of time periods, the project management server system 102 calculates the total number of all tasks (or WIP tasks) that existed for that time period. The project management server system 102 also calculates the priority of each WIP task for that time period. In another embodiment of the present invention, the project management server system 102 further calculates any of the following information for each WIP task for that time period: the particular project or projects pertaining to each task, the particular division pertaining to each task, the particular business unit pertaining to each task, the particular customer pertaining to each task, the particular portfolio pertaining to each task, the particular project manager pertaining to each task, the particular task manager pertaining to each task, the particular task status pertaining to each task, the particular resource manager pertaining to each task, and the particular resource pertaining to each task.

In step 1612, the project management server system 102 generates a graphic that visually indicates the information that was calculated in step 1608 above. A graphic is a computer readable group of data that, when read by an appropriate computer component, can be displayed on a flat panel display, a monitor or a cathode ray tube. An example of a graphic can be a JPEG file that is stored or transmitted for reading by a computer and display on a monitor. The graphic of step 1612 comprises a chart, a spreadsheet or a graph that visually indicates numerical or other information. The graphic may comprise a bar chart, a pie chart, a linear graph or a three dimensional graph.

In one embodiment of the present invention, the project management server system 102 generates a graphic comprising a vertical bar chart wherein a vertical bar is generated for each time period of the list of time periods. Along the x-axis of the bar chart, time periods are depicted. Along the y-axis of the bar chart, a number of WIP tasks is indicated. The length of each bar represents the number of WIP tasks for that time period, as calculated in step 1608 above. The bar can further be broken down or segmented into separate segments using, for example, colors or horizontal lines. The segments are used to indicate the priority of each WIP task for that time period. That is, each segment represents the number of WIP tasks in that time period with a given priority. For example, red may be used for a first segment to indicate the number of high priority tasks, yellow may be used for a second segment to indicate the number of medium priority tasks, and green may be used for a third segment to indicate the number of low priority tasks. Examples of the graphic of step 1612 are provided below with reference to FIGS. 18-29.

In optional step 1614, the project management server system 102 modifies the graphic to visually indicate additional information that was calculated in step 1608. In one embodiment of the present invention, the project management server system 102 modifies the graphic by modifying the vertical bar that is generated for each time period of the list of time periods. Each bar can further be broken down or segmented into separate segments to indicate additional information for each time period, such as: the number of tasks pertaining to each project or projects, the number of tasks pertaining to each division, the number of tasks pertaining to each business unit, the number of tasks pertaining to each customer, the number of tasks pertaining to each portfolio, the number of tasks pertaining to each project manager, the number of tasks pertaining to each task manager, the number of tasks pertaining to each task status, the number of tasks pertaining to each resource manager, and the number of tasks pertaining to each resource.

In one optional step, the project management server system 102 modifies the graphic to visually indicate additional information. In one embodiment of the present invention, the project management server system 102 generates an additional vertical bar for each time period of the list of time periods. Each vertical bar indicates the number of IP tasks for that time period. That is, the length of each bar represents the number of IP tasks for that time period. The bar can further be broken down or segmented into separate segments using, for example colors or horizontal lines. The segments are used to indicate the priority of each IP task for that time period. That is, each segment represents the number of IP tasks in that time period with a given priority.

In another optional step, the project management server system 102 modifies the graphic to visually indicate additional information. In one embodiment of the present invention, the project management server system 102 modifies the graphic by modifying the vertical bar (of the optional step above) that is generated for each time period of the list of time periods. Each vertical bar can further be broken down or segmented into separate segments to indicate additional information for each time period, such as: the number of tasks pertaining to each project or projects, the number of tasks pertaining to each division, the number of tasks pertaining to each business unit, the number of tasks pertaining to each customer, the number of tasks pertaining to each portfolio, the number of tasks pertaining to each project manager, the number of tasks pertaining to each task manager, the number of tasks pertaining to each task status, the number of tasks pertaining to each resource manager, and the number of tasks pertaining to each resource.

In step 1620, the graphic is provided to a user of the project management server system 102. In one embodiment of the present invention, the graphic is directly provided to a monitor that subsequently displays the graphic to the user. In another embodiment of the present invention, the graphic is provided to a client, such as the flow trend client 222, on a computer of a user via a network, such as network 104 or a WAN. The graphic is then displayed on a monitor of the user computer. In step 1622, the control flow of FIG. 16 stops.

Figure 17:
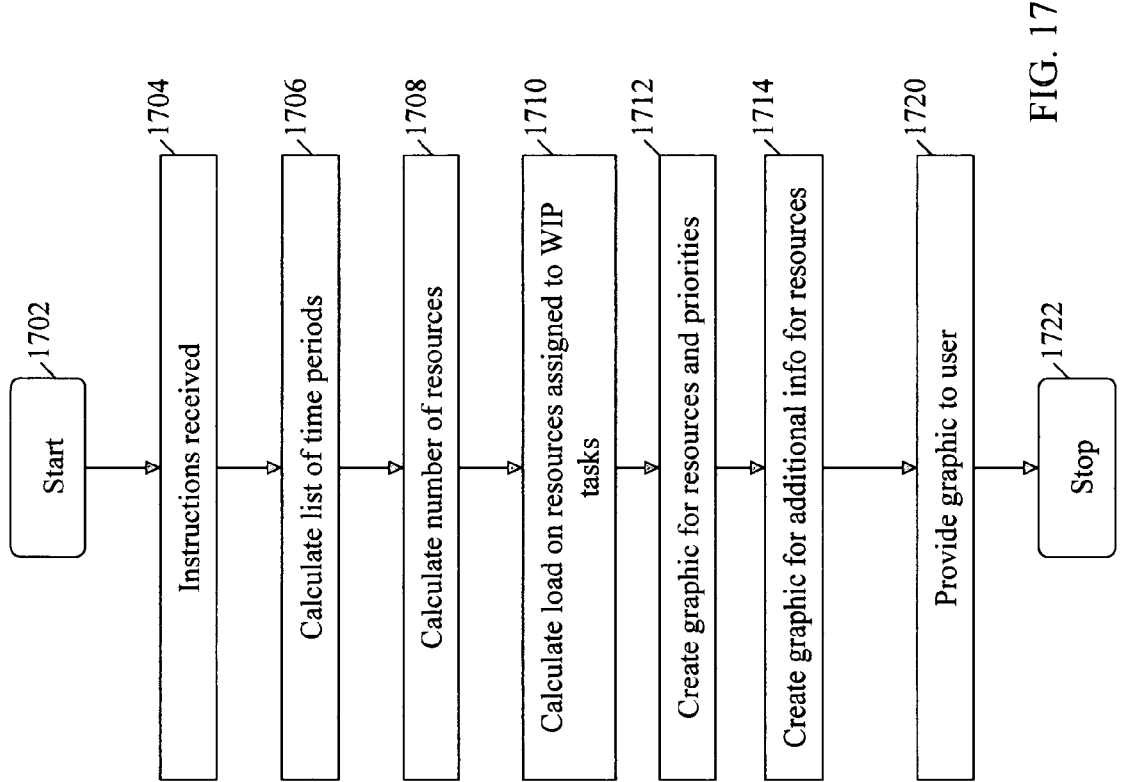
FIG. 17 is an operational flow diagram showing another throughput measurement graphic generation process according to another embodiment of the present invention.

FIG. 17 is an operational flow diagram showing another throughput measurement graphic generation process according to another embodiment of the present invention. The operation and control flow of FIG. 17 begins with step 1702 and proceeds directly to step 1704.

In step 1704, the project management server system 102 receives instructions for creating a graphic for measuring throughput in an ongoing project or projects. The instructions of step 1704 are similar or identical to the instructions of step 1604 above. In step 1706, the project management server system 102 generates a list of time periods for a specific project or projects, similar to step 1606 above.

In step 1708, for each time period of the list of time periods, the project management server system 102 calculates the total number of resource units that existed for that time period. The project management server system 102 also calculates the priority of each resource for that time period. In another embodiment of the present invention, the project management server system 102 further calculates any of the following information for each resource for that time period: the particular project or projects pertaining to each resource, the particular division pertaining to each resource, the particular business unit pertaining to each resource, the particular customer pertaining to each resource, the particular portfolio pertaining to each resource, the particular project manager pertaining to each resource, and the particular resource manager pertaining to each resource.

In step 1710, the project management server system 102 calculates the load on resources assigned to WIP tasks for each time period of the list of time periods. In step 1712, the project management server system 102 generates a graphic that visually indicates the information that was calculated in steps 1708-1710 above. The graphic of step 1712 is similar to the graphic of step 1612 above.

In one embodiment of the present invention, the project management server system 102 generates a graphic comprising a vertical bar chart wherein a vertical bar is generated for each time period of the list of time periods, similar to step 1612 above. Along the x-axis of the bar chart, time periods are depicted. Along the y-axis of the bar chart, a number of resource units is indicated. The length of each bar represents the resource load exacted by tasks for that time period, as calculated in steps 1708-1710 above. The bar can further be broken down or segmented into separate segments using, for example, colors or horizontal lines. The segments are used to indicate the priority of each tasks for that time period. That is, each segment represents the number of tasks in that time period with a given priority. Examples of the graphic of step 1712 are provided below with reference to FIGS. 18-29.

In optional step 1714, the project management server system 102 modifies the graphic to visually indicate additional information that was calculated in steps 1708-1710. In one embodiment of the present invention, the project management server system 102 modifies the graphic by modifying the vertical bar that is generated for each time period of the list of time periods. Each bar can further be broken down or segmented into separate segments to indicate additional information for each time period, such as: the number of resources pertaining to each project or projects, the number of resources pertaining to each division, the number of resources pertaining to each business unit, the number of resources pertaining to each customer, the number of resources pertaining to each portfolio, the number of resources pertaining to each project manager, and the number of resources pertaining to each resource manager.

In step 1720, the graphic is provided to a user of the project management server system 102, similar to step 1620 above. In step 1722, the control flow of FIG. 17 stops.

Figure 18:
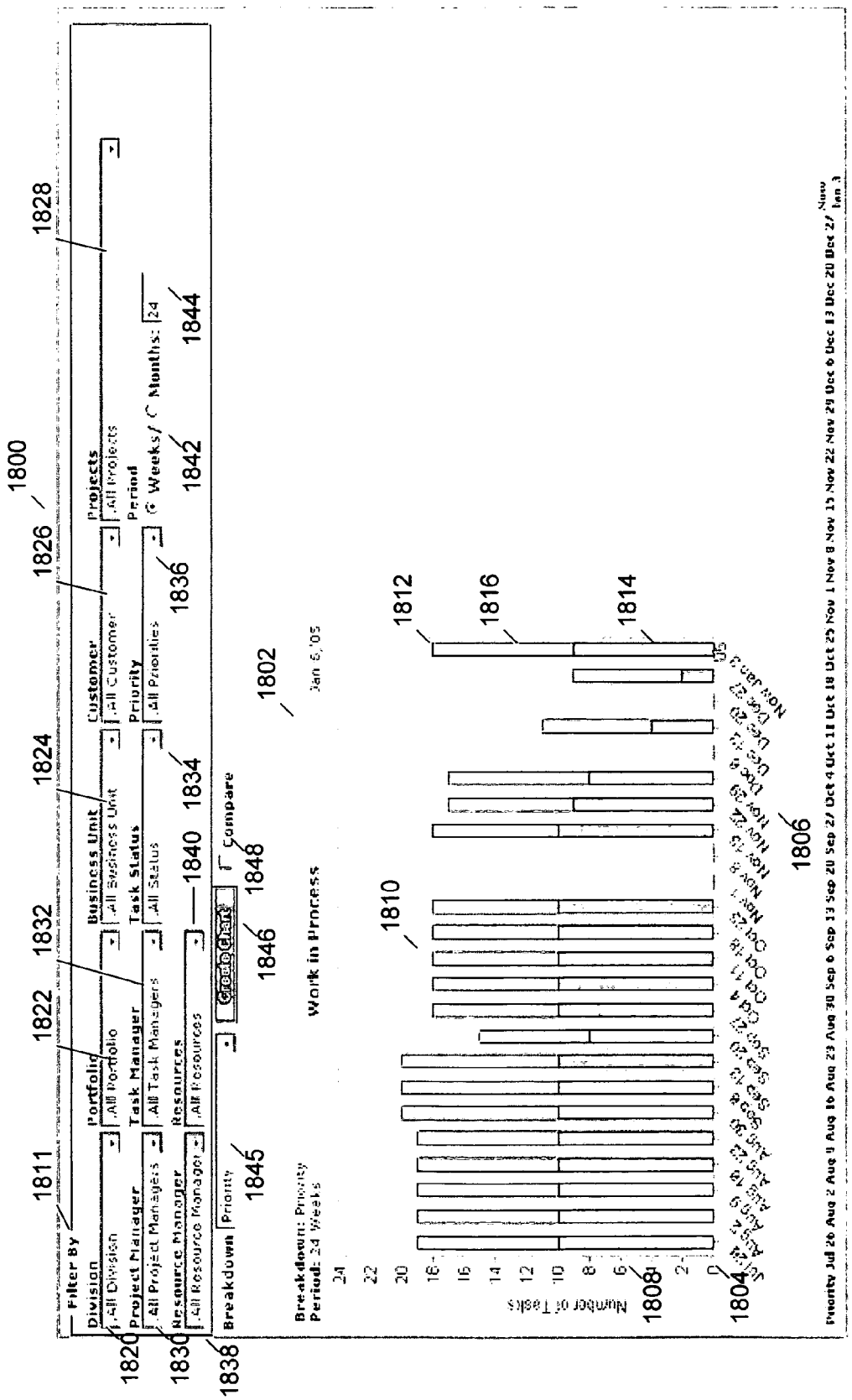
FIG. 18 is a screenshot of a user interface showing a throughput measurement graphic in one embodiment of the present invention.

FIG. 18 is a screenshot of a user interface 1800 showing a throughput measurement graphic in one embodiment of the present invention. The user interface 1800 is used for visually indicating throughput measurements to a user, as described in greater detail below. The user interface 1800 can be realized as a Web page accessible over the Web by a Web browser or as a graphical object that is imply displayed on a monitor. The user interface 1800 shows a bar graph indicating the number of tasks for each of a list of time period, and the priority of each task in that time period. Pull down menus and other interface widgets of the user interface 1800 allow for different views of information, as described in the additional figures below.

The user interface 1800 shows a vertical bar chart 1802 wherein a vertical bar is generated for each time period of a list of time periods. Along the x-axis 1804 of the bar chart 1802, time periods 1806 are depicted. Along the y-axis 1808 of the bar chart 1802, a total number of tasks (i.e., WIP tasks) is indicated by the length of each bar 1810. The length of each bar 1810 represents the number of WIP tasks for that time period (for example, as calculated in step 1608 above). Each bar is further broken down into separate segments using colors or horizontal lines. The segments are used to show the number of WIP tasks in that time period with a given priority. For example, bar 1812 shows a first segment 1814 that indicates the number of high priority tasks, and a second segment 1816 that indicates the number of low priority tasks. The almost equal length of segment 1814 and segment 1816 indicates that there was an almost equal number of high priority and low priority tasks during the time period starting Jan. 3, 2005. The length of bar 1812 indicates that a total of about eighteen tasks exist for the period starting Jan. 3, 2005.

The user interface 1800 further shows a set of interface widgets 1811, indicated by a "Filter By" text. The set of interface widgets 1811 are used for specifying restraints that are reflected in the bar chart 1802. The pull down menu 1820 is used to filter the bar chart 1802 by division, and it is currently selected to "All Divisions" such that all tasks for all divisions are considered for the calculations reflected in the bars of bar chart 1802. Individual divisions can be selected from pull down menu 1820 such that only the tasks for the selected division are considered for the calculations reflected in the bars of bar chart 1802. The pull down menu 1822 is used to filter the bar chart 1802 by portfolio, and it is currently selected to "All Portfolios" such that all tasks for all portfolios are considered for the calculations reflected in the bars of bar chart 1802. Individual portfolios can be selected from pull down menu 1822 such that only the tasks for the selected portfolios are considered for the calculations reflected in the bars of bar chart 1802.

The pull down menu 1824 is used to filter the bar chart 1802 by business unit, and it is currently selected to "All Business Units" such that all tasks for all business units are considered for the calculations reflected in the bars of bar chart 1802. Individual business units can be selected from pull down menu 1824 such that only the tasks for the selected business unit are considered for the calculations reflected in the bars of bar chart 1802. The pull down menu 1826 is used to filter the bar chart 1802 by customer, and it is currently selected to "All Customers" such that all tasks for all customers are considered for the calculations reflected in the bars of bar chart 1802. Individual customers can be selected from pull down menu 1826 such that only the tasks for the selected customers are considered for the calculations reflected in the bars of bar chart 1802.

The pull down menu 1828 is used to filter the bar chart 1802 by projects, and it is currently selected to "All Projects" such that all tasks for all projects are considered for the calculations reflected in the bars of bar chart 1802. Individual projects can be selected from pull down menu 1828 such that only the tasks for the selected projects are considered for the calculations reflected in the bars of bar chart 1802. The pull down menu 1830 is used to filter the bar chart 1802 by project manager, and it is currently selected to "All Project Managers" such that all tasks for all project managers are considered for the calculations reflected in the bars of bar chart 1802. Individual project managers can be selected from pull down menu 1830 such that only the tasks for the selected project managers are considered for the calculations reflected in the bars of bar chart 1802.

The pull down menu 1832 is used to filter the bar chart 1802 by task manager, and it is currently selected to "All Task Managers" such that all tasks for all task managers are considered for the calculations reflected in the bars of bar chart 1802. Individual task managers can be selected from pull down menu 1832 such that only the tasks for the selected task manager are considered for the calculations reflected in the bars of bar chart 1802. The pull down menu 1834 is used to filter the bar chart 1802 by task status, and it is currently selected to "All Status" such that all tasks of all task statuses are considered for the calculations reflected in the bars of bar chart 1802. Individual task statuses can be selected from pull down menu 1834 such that only the tasks for the selected task status are considered for the calculations reflected in the bars of bar chart 1802. As indicated above, there are three task status values: WIP tasks, NS tasks and IP tasks. A selection of "All Status" from pull down menu 1834 indicates a selection of all or WIP tasks, a selection of "NS tasks" indicates tasks that have not been started yet, and a selection of "IP tasks" indicates tasks that are currently in-progress or have already started.

The pull down menu 1836 is used to filter the bar chart 1802 by priority, and it is currently selected to "All Priorities" such that all tasks of all priorities are considered for the calculations reflected in the bars of bar chart 1802. Individual priorities can be selected from pull down menu 1836 such that only the tasks for the selected priority are considered for the calculations reflected in the bars of bar chart 1802. As indicated above, there are three task priority values: red (or high priority) tasks, yellow (or medium priority) tasks and green (or low priority) tasks. A selection of "Red" from pull down menu 1836 indicates a selection of red priority tasks, a selection of "Yellow" indicates a selection of yellow priority tasks, and a selection of "Green" indicates a selection of green priority tasks.

The pull down menu 1838 is used to filter the bar chart 1802 by resource manager, and it is currently selected to "All Resource Managers" such that all tasks for all resource managers are considered for the calculations reflected in the bars of bar chart 1802. Individual resource managers can be selected from pull down menu 1838 such that only the tasks for the selected resource managers are considered for the calculations reflected in the bars of bar chart 1802.

The pull down menu 1840 is used to filter the bar chart 1802 by resource, and it is currently selected to "All Resources" such that all tasks for all resources are considered for the calculations reflected in the bars of bar chart 1802. Individual resources can be selected from pull down menu 1840 such that only the tasks for the selected resource are considered for the calculations reflected in the bars of bar chart 1802. Radio buttons 1842 allow a user to select a time period duration by selecting either "weeks" or "months" and further entering a number into the text field 1844. These widgets are currently set at 24 weeks.

The pull down menu 1845 is used to indicate the breakdown or segmentation of the bars 1810 of the bar chart 1802. Menu 1845 is currently selected to "Priority" such each bar 1810 is segmented into separate segments indicating the number of tasks in that time period that held each priority value. Other breakdown attributes can be selected from pull down menu 1845 such that each bar 1810 is segmented into separate segments indicating the number of tasks in that time period that possess the selected attribute. Other breakdown attributes that can be selected from pull down menu 1845 include: task division, task portfolio, task business unit, task project, task project manager, task manager, task status, task priority, task resource manager and task resource.

FIG. 18 further includes a button 1846 including a "Create Chart" text. Once the appropriate selections are made by the user from the other widgets of interface 1811, the user can press the button 1846 to generate the bar chart 1802 that reflects his selections. Alternatively, the user can select the check box 1848 and subsequently press the button 1846 so as to create two separate bar charts depicting two separate data specifications. Examples of such a bar chart are shown with reference to FIGS. 20 and 21 below.

The user interface 1800 is used by managers or division heads to manage projects within the project management server system 102 during the course of a project or projects. The user interface 1800 provides the advantage of allowing for quick and easy generation of bar charts that visually indicate the throughput of a system, allows a user to breakdown throughput measurements by status and priorities, and allow the user to measure throughput at various levels of an organization. This allows a user, such as a manager or a division head, to identify when queues are building up, thereby creating longer wait times, and identify bottlenecks or opportunities to increase throughput of the system. For example, an increasing trend of high priority tasks above available capacity high priority tasks indicates that work is getting stuck or delayed at a bottleneck, causing throughput to decrease. This allows for corrective action to be taken at a local level—at the bottleneck.

Figure 19:
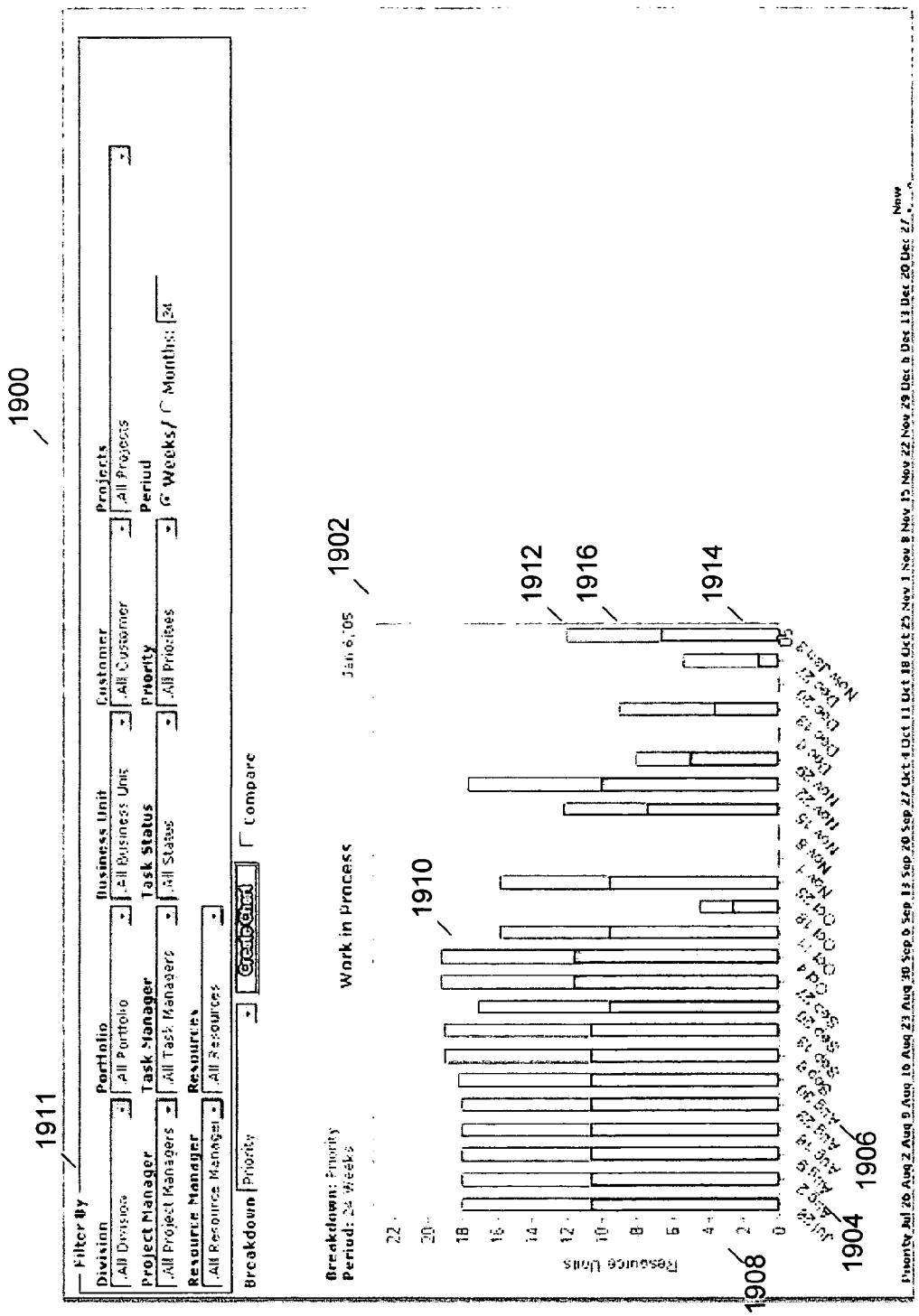
FIG. 19 is a screenshot of another user interface showing a throughput measurement graphic in one embodiment of the present invention.

FIG. 19 is a screenshot of another user interface 1900 showing a throughput measurement graphic in one embodiment of the present invention. Like user interface 1800, user interface 1900 is used for visually indicating throughput measurements to a user, as described in greater detail below. The user interface 1900 shows a bar graph indicating the resource load (measured in resource units) for the tasks pertaining to each of a list of time periods, and the priority of the tasks pertaining to each time period. Pull down menus and other interface widgets of the user interface 1900 allow for different views of information, as described in the additional figures below.

The user interface 1900 shows a vertical bar chart 1902 wherein a vertical bar is generated for each time period of a list of time periods. Along the x-axis 1904 of the bar chart 1902, time periods 1906 are depicted. Along the y-axis 1908 of the bar chart 1902, a total number of resource units are indicated by the length of each bar 1910. The length of each bar 1910 represents the number of resource units representing the resource load of the tasks for that time period (for example, as calculated in step 1708 above). Each bar is further broken down into separate segments using colors or horizontal lines. The segments are used to show the number of tasks in that time period with a given priority. For example, bar 1912 shows a first segment 1914 that indicates the number of high priority tasks, and a second segment 1916 that indicates the number of low priority tasks. The almost equal length of segment 1914 and segment 1916 indicates that there was an almost equal number of high priority and low priority tasks during the time period starting Jan. 3, 2005. The length of bar 1912 indicates that about eighteen resource units represent the resource load for the tasks for the time period starting Jan. 3, 2005. The user interface 1900 further shows a set of interface widgets 1911, similar to those of interface 1800.

Figure 20:
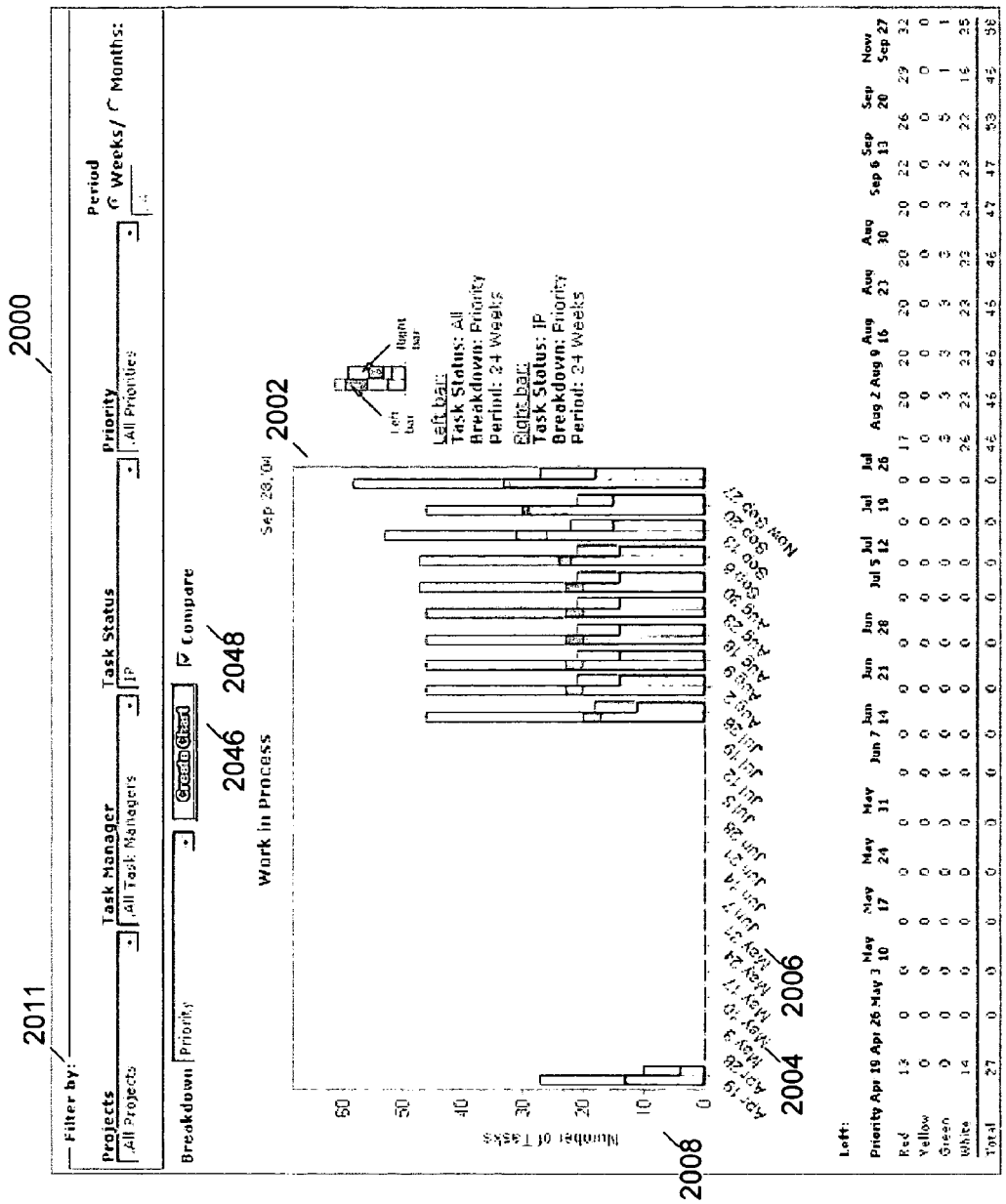
FIG. 20 is a screenshot of yet another user interface showing a throughput measurement graphic in one embodiment of the present invention.

FIG. 20 is a screenshot of yet another user interface 2000 showing a throughput measurement graphic in one embodiment of the present invention. Like user interface 1800, the user interface 2000 is used for visually indicating throughput measurements to a user. The user interface 2000 shows a bar graph indicating the number of tasks for each of a list of time periods, and the priority of each task in that time period. Pull down menus and other interface widgets of the user interface 2000 allow for different views of information, as described in the additional figures below.

The user interface 2000 shows a vertical bar chart 2002 (similar to the bar chart 1802 of FIG. 18) wherein two vertical bars are generated for each time period of a list of time periods. Along the x-axis 2004 of the bar chart 2002, time periods 2006 are depicted. Along the y-axis 2008 of the bar chart 2002, a total number of tasks (i.e., WIP tasks) is indicated by the length of each left side bar and a total number of IP tasks is indicated by the length of each right side bar. Each bar is further broken down into separate segments using colors or horizontal lines. The segments are used to show the number of tasks in that time period with a given priority. The user interface 1800 further shows a set of interface widgets 2011 similar to the set of widgets 1811 of FIG. 18.

FIG. 20 further includes a button 2046 including a "Create Chart" text. Once the appropriate selections are made by the user from the other widgets of interface 2002, the user can press the button 2046 to generate the bar chart 2002 that reflects his selections. Then, the user can select the check box 2048 and subsequently press the button 2046 so as to create two separate bar charts depicting two separate data specifications. FIG. 20, for example, shows two vertical bars for each time period, wherein the left side bar represents the WIP tasks for the time period and the right side bar represents the IP tasks for the time period. In short, user interface 2000 can be used to compare the throughput of WIP Tasks with the throughput of IP tasks, using the side-by-side arrangement of the two bars for each time period. A comparison of the high priority (red and yellow) NS and IP tasks with WIP tasks indicates if priorities are being followed and tasks are being started based on the priorities.

Figure 21:
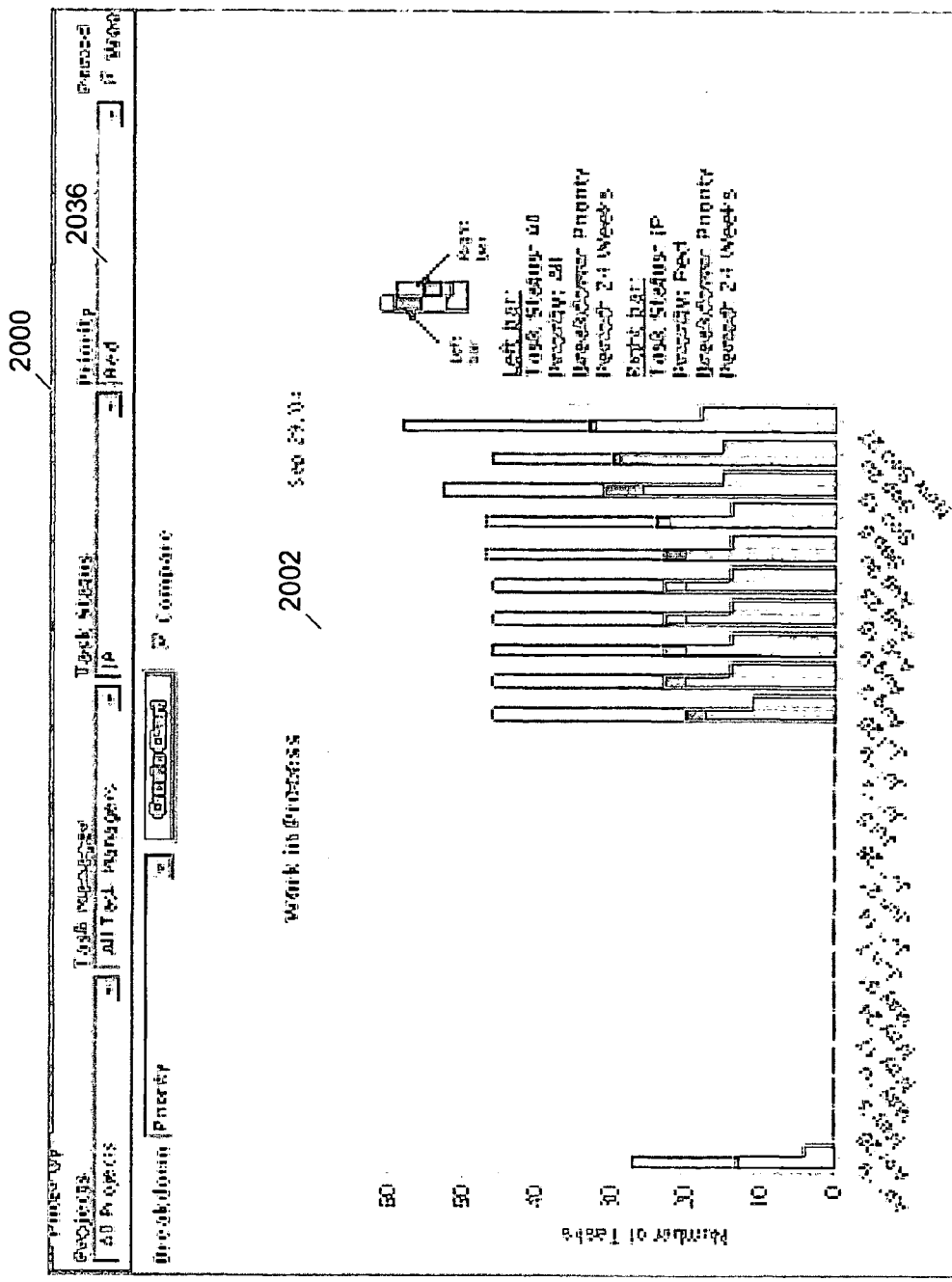
FIG. 21 is a screenshot of the user interface of FIG. 20 after additional selections have been made.

FIG. 21 is a screenshot of the user interface 2000 of FIG. 20 after an additional selection has been made. User interface 2000 shows the result of selecting the "Red" selection from the priority pull down menu 2036. User interface 2000 shows a vertical bar chart 2002 wherein two vertical bars are generated for each time period of a list of time periods. A total number of tasks (i.e., WIP tasks) is indicated by the length of each left side bar and a total number of IP tasks is indicated by the length of each right side bar. Each bar is further broken down into separate segments using colors or horizontal lines. The segments are used to show the number of tasks in that time period with a given priority. The act of selecting the "Red" selection from the priority pull down menu 2036 results in the right side bar being limited to "Red" or high priority tasks, consequently, each right side bar comprises only one segment, indicating all "Red" tasks.

In short, user interface 2000 of FIG. 21 can be used to compare the throughput of WIP Tasks with the throughput of high priority IP tasks, using the side-by-side arrangement of the two bars for each time period.

Figure 22:
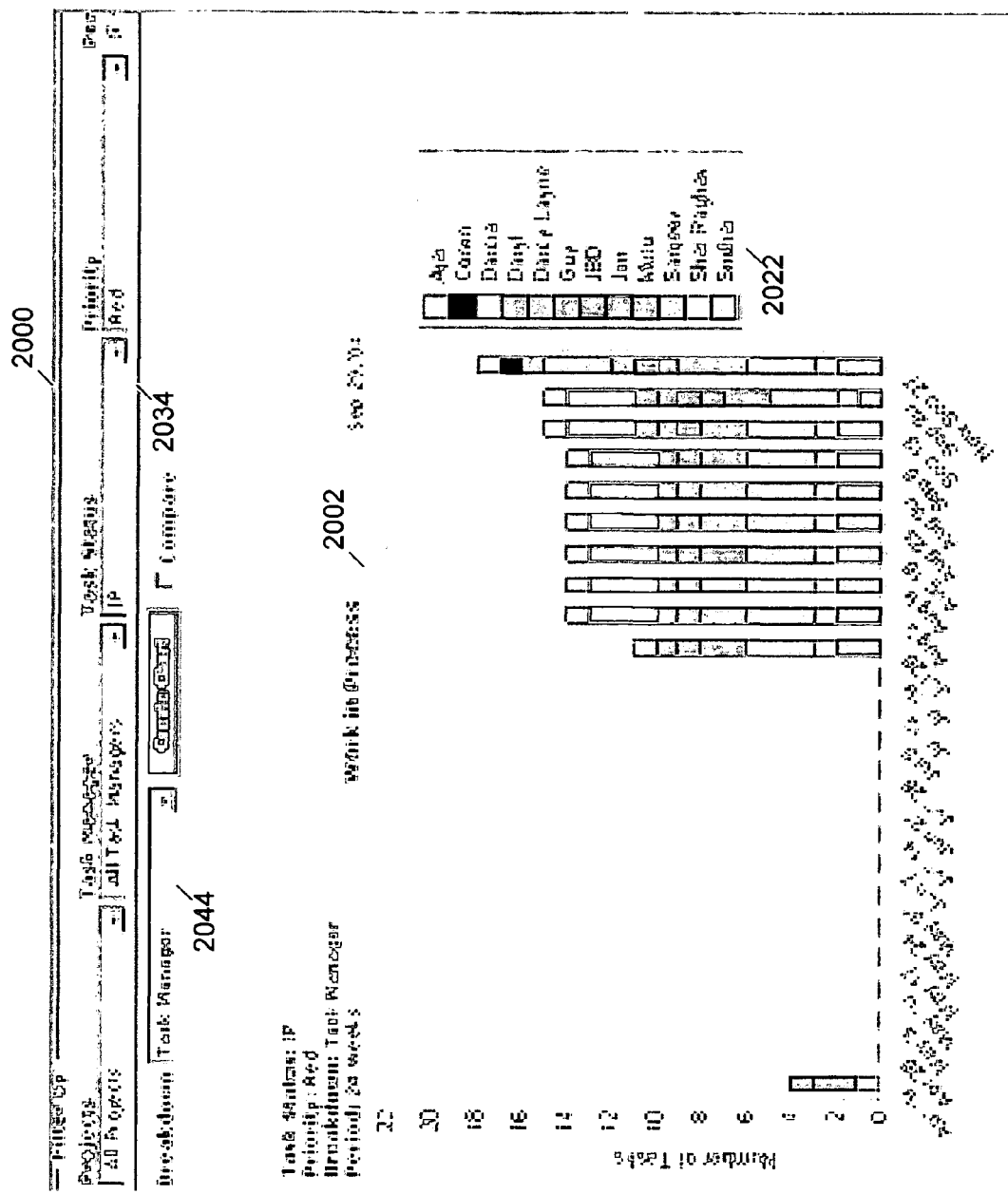
FIG. 22 is a screenshot of the user interface of FIG. 21 after additional selections have been made.

FIG. 22 is a screenshot of the user interface 2000 of FIG. 21 after an additional selection has been made. User interface 2000 shows the result of selecting the "Task Manager" selection from the breakdown pull down menu 2045. User interface 2000 shows a vertical bar chart 2002 wherein one vertical bar is generated for each time period of a list of time periods. A total number of IP tasks is indicated by the length of each bar (see selection of "IP" in task status pull down menu 2034). Each bar is further broken down into separate segments using colors or horizontal lines. The segments are used to show the number of tasks in that time period that correspond to a particular task manager. The act of selecting the "Task Manager" selection from the breakdown pull down menu 2045 results in each bar being broken down into separate segments, wherein each segment represents a separate task manager. The legend 2022 on the right side of the bar chart 2002 explains the different shading or color of each segment.

In short, user interface 2000 of FIG. 22 can be used to view the distribution of high priority IP tasks among task managers, using segmented bars for each time period.

Figure 23:
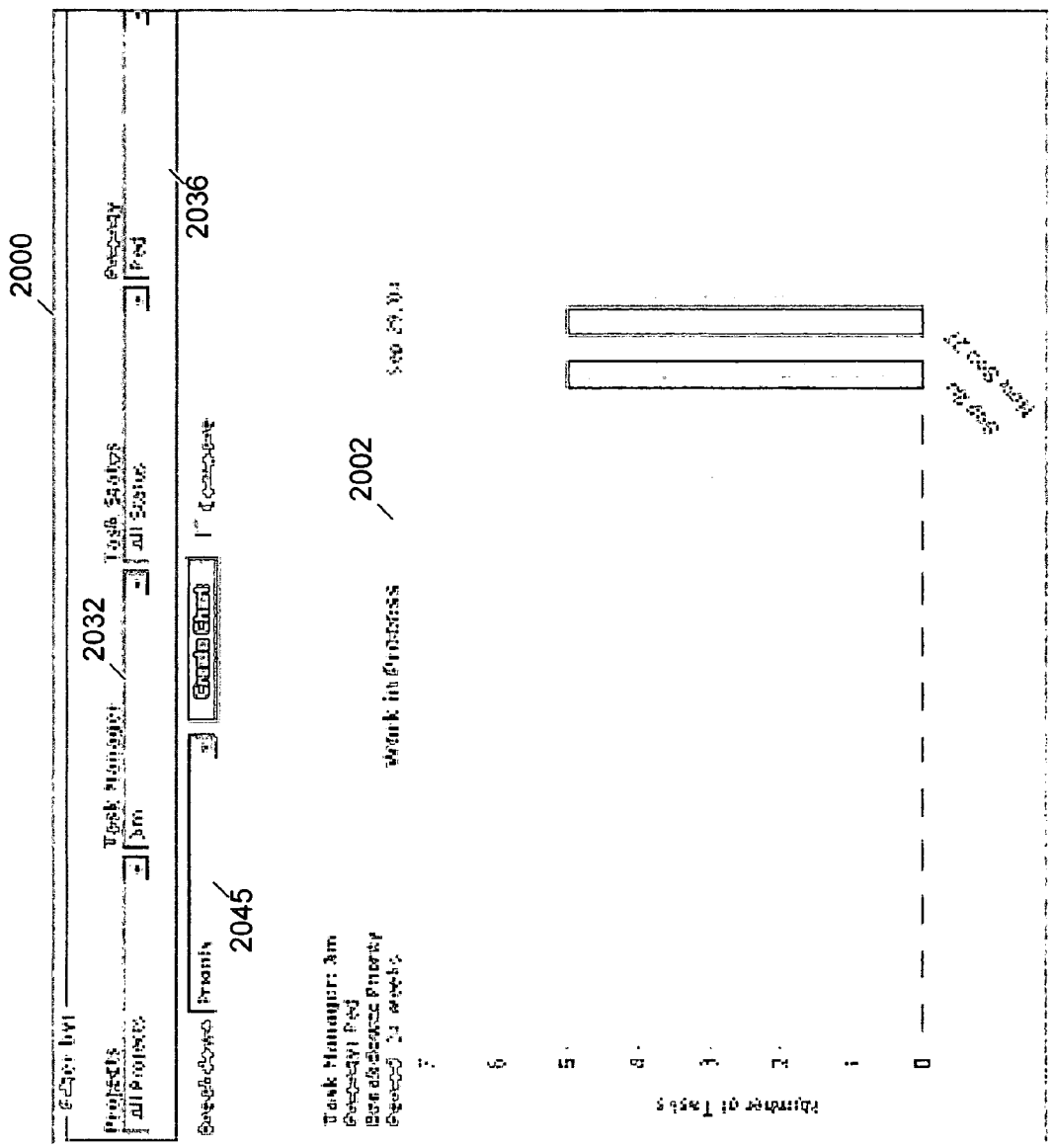
FIG. 23 is a screenshot of the user interface of FIG. 22 after additional selections have been made.

FIG. 23 is a screenshot of the user interface 2000 of FIG. 22 after additional selections have been made. User interface 2000 shows the result of 1) returning the breakdown pull down menu 2045 to the "Priority" selection, and 2) selecting a particular task manager—Jim—from the task manager pull down menu 2032. User interface 2000 shows a vertical bar chart 2002 wherein one vertical bar is generated for each time period of a list of time periods. A total number of WIP tasks is indicated by the length of each bar (see selection of "All Status" in task status pull down menu 2034). Each bar is not broken down into separate segments since only one priority is selected from the priority pull down menu 2036—"Red" is selected. Thus, only high level priority tasks are counted for the bars in the bar chart 2002. The act of selecting the "Jim" selection from the task manager pull down menu 2032 results in each bar representing only those tasks that pertain to the particular task manager for each time period.

In short, user interface 2000 of FIG. 23 can be used to view the amount of high priority WIP tasks assigned to a particular task manager.

Figure 24:
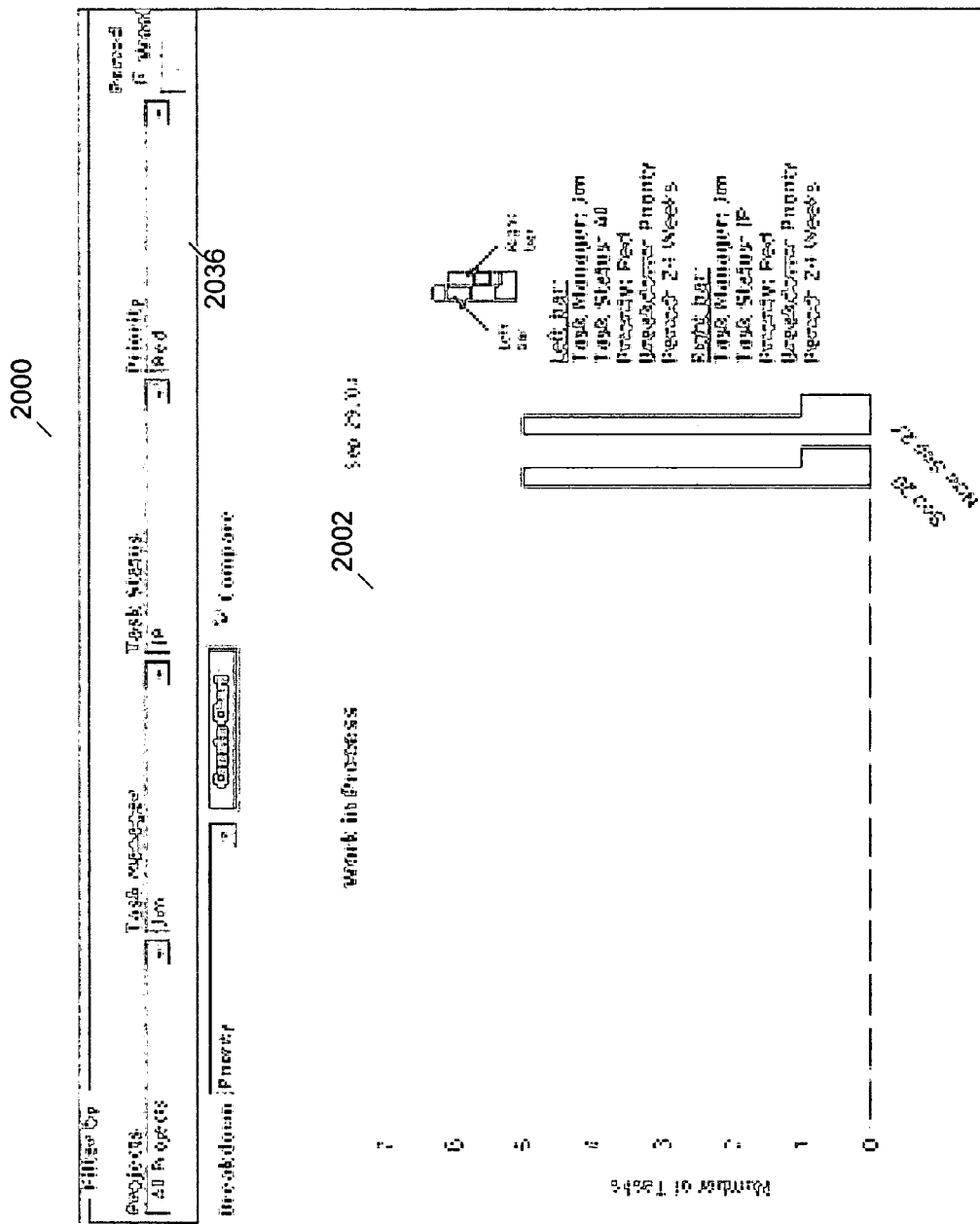
FIG. 24 is a screenshot of the user interface of FIG. 23 after additional selections have been made.

FIG. 24 is a screenshot of the user interface 2000 of FIG. 23 after an additional selection has been made. User interface 2000 shows the result of selecting the "Red" selection from the priority pull down menu 2036. User interface 2000 shows a vertical bar chart 2002 wherein two vertical bars are generated for each time period of a list of time periods. A total number of tasks (i.e., WIP tasks) is indicated by the length of each left side bar and a total number of IP tasks is indicated by the length of each right side bar. Each bar is not broken down into separate segments since only one priority is selected from the priority pull down menu 2036—"Red" is selected. Thus, only high level priority tasks are counted for the bars in the bar chart 2002.

In short, user interface 2000 of FIG. 24 can be used to compare the amount of high priority WIP tasks assigned to a particular task manager with the amount of high priority IP tasks assigned to the same task manager.

Figure 25:
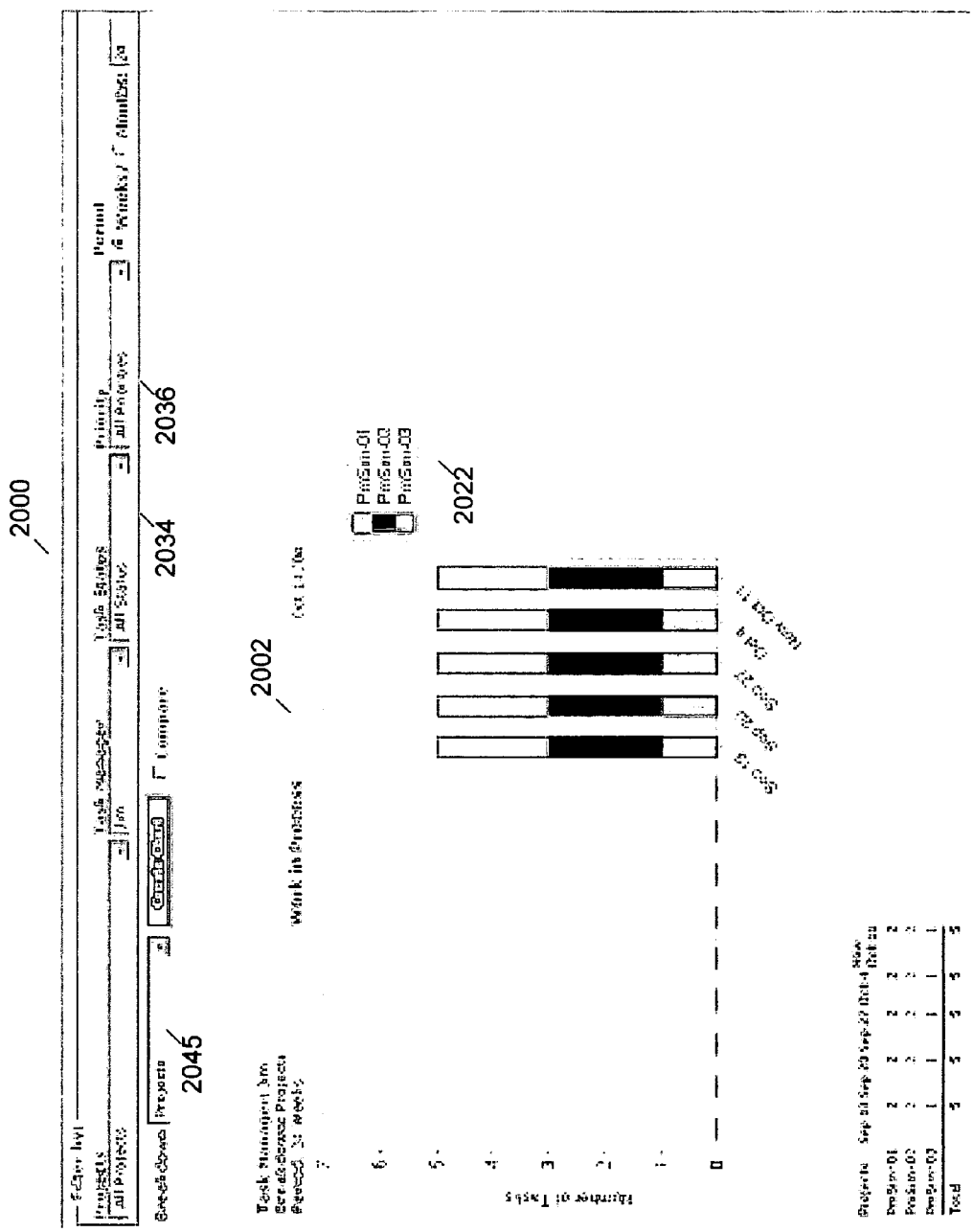
FIG. 25 is a screenshot of the user interface of FIG. 24 after additional selections have been made.

FIG. 25 is a screenshot of the user interface 2000 of FIG. 24 after additional selections have been made. User interface 2000 shows the result of selecting the "Projects" selection from the breakdown pull down menu 2045. Further, the priority pull down menu 2036 has been returned to the "All Priorities" selection. User interface 2000 shows a vertical bar chart 2002 wherein one vertical bar is generated for each time period of a list of time periods. A total number of WIP tasks is indicated by the length of each bar (see selection of "All Status" in task status pull down menu 2034). Each bar is further broken down into separate segments using colors or horizontal lines. The segments are used to show the number of tasks in that time period that correspond to a particular projects. The act of selecting the "Projects" selection from the breakdown pull down menu 2045 results in each bar being broken down into separate segments, wherein each segment represents a separate project. The legend 2022 on the right side of the bar chart 2002 explains the different shading or color of each segment.

In short, user interface 2000 of FIG. 25 can be used to view the amount of WIP tasks assigned to a particular task manager, wherein the tasks are broken down by particular projects.

Figure 26:
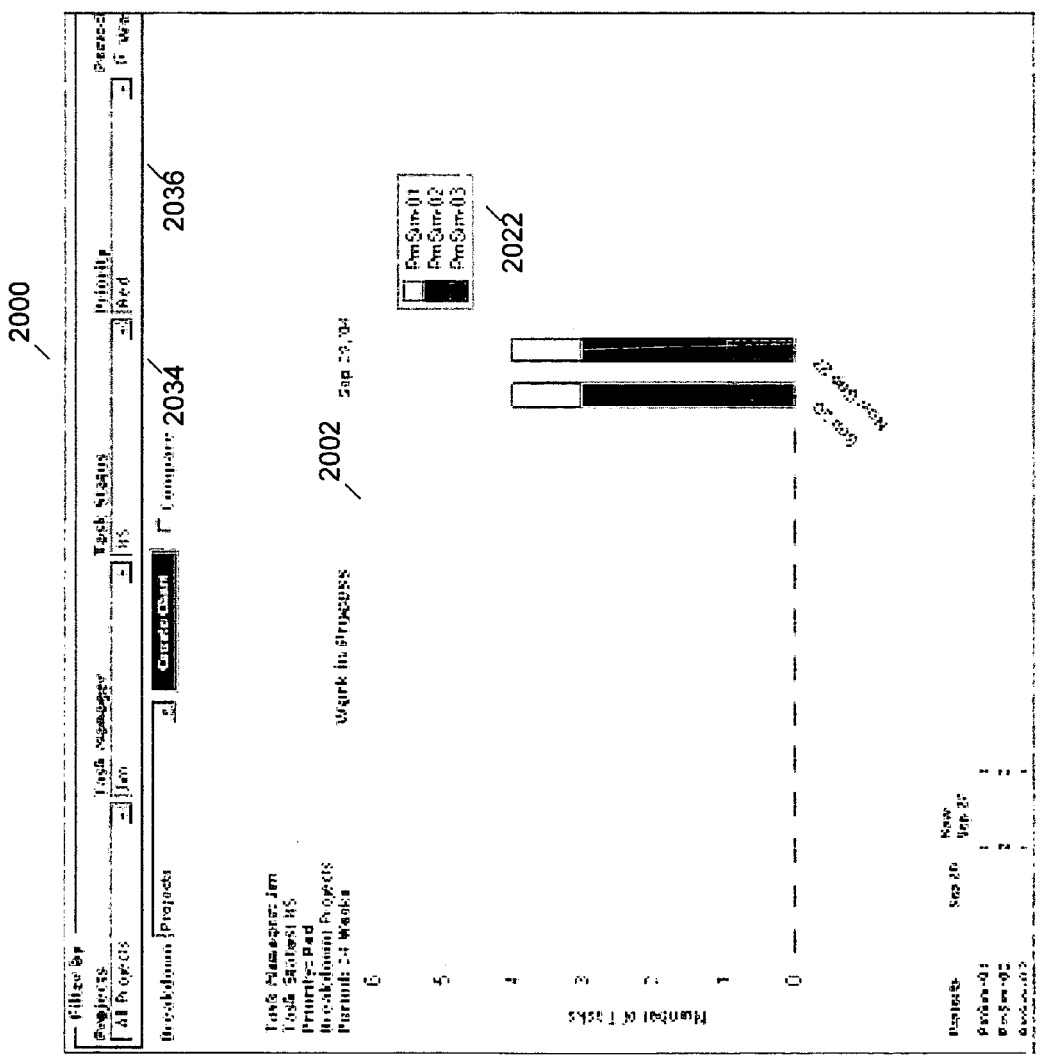
FIG. 26 is a screenshot of the user interface of FIG. 25 after additional selections have been made.

FIG. 26 is a screenshot of the user interface 2000 of FIG. 25 after additional selections have been made. User interface 2000 shows the result of selecting the "NS" selection from the task status pull down menu 2034. Further, the priority pull down menu 2036 has been returned to the "Red" selection. User interface 2000 shows a vertical bar chart 2002 wherein one vertical bar is generated for each time period of a list of time periods. A total number of NS tasks is indicated by the length of each bar (see selection of "NS" in task status pull down menu 2034). Each bar is further broken down into separate segments representing separate projects for the selected task manager for the time period. The legend 2022 on the right side of the bar chart 2002 explains the different shading or color of each segment.

In short, user interface 2000 of FIG. 26 can be used to view the amount of high priority NS tasks assigned to a particular task manager, wherein the tasks are broken down by particular projects.

Figure 27:
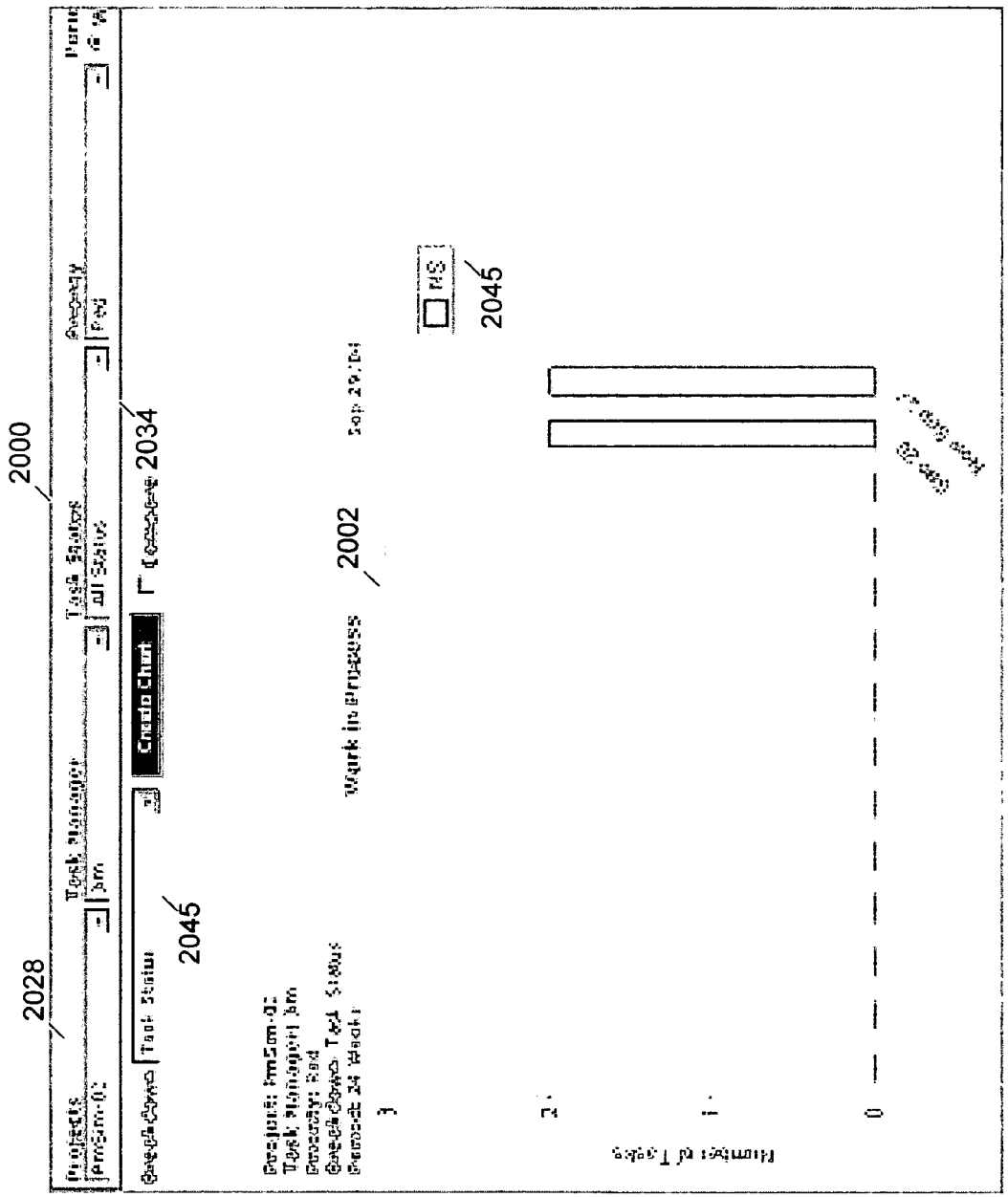
FIG. 27 is a screenshot of the user interface of FIG. 26 after additional selections have been made.

FIG. 27 is a screenshot of the user interface 2000 of FIG. 24 after additional selections have been made. User interface 2000 shows the result of selecting a project from the project pull down menu 2028, selecting the "All Status" selection from the task status pull down menu 2034 and selecting "Task Status" from the breakdown pull down menu 2045. User interface 2000 shows a vertical bar chart 2002 wherein one vertical bar is generated for each time period of a list of time periods. A total number of WIP tasks for the selected project is indicated by the length of each bar (see selection of "All Status" in task status pull down menu 2034). Each bar is broken down into separate segments representing separate task statuses for the selected task manager for the time period, however since this particular task manager possesses only "NS" status tasks for the selected project, it is shown that each bar comprises only one segment. The legend 2022 on the right side of the bar chart 2002 explains the different shading or color of each segment.

In short, user interface 2000 of FIG. 27 can be used to view the amount of high priority WIP tasks assigned to a particular task manager for a particular project, wherein the tasks are broken down by particular task statuses.

Figure 28:
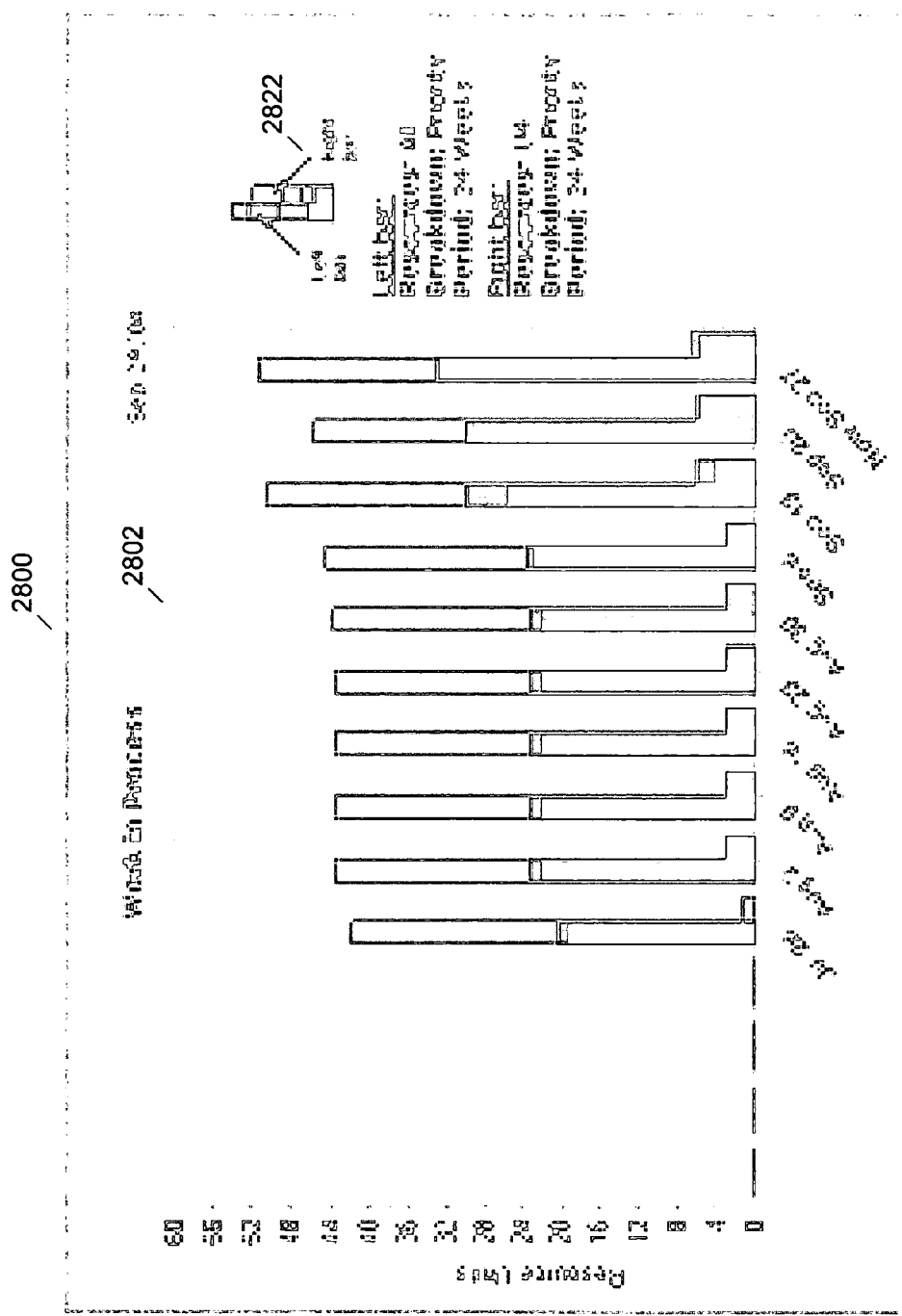
FIG. 28 is a screenshot of another user interface showing a throughput measurement graphic in one embodiment of the present invention.

FIG. 28 is a screenshot of another user interface showing a throughput measurement graphic in one embodiment of the present invention. Like user interface 1900, user interface 2800 is used for visually indicating throughput measurements to a user. The user interface 2800 shows a bar chart 2802 indicating the resource load (measured in resource units) for the tasks that pertain to each of a list of time periods, and the priority of each task in that time period. FIG. 28 shows that two bars are present for each time period. The first left-side bar for each time period represents the resource load for the all tasks (i.e., WIP tasks or Work-In-Process tasks) for the time period. The second right-side bar for each time period represents the resource load for IP tasks (or In-Progress tasks) for the time period. Each bar is broken down into separate segments representing the priorities for the group of tasks pertaining to each time period. The legend 2822 on the right side of the bar chart 2802 explains the different shading or color of each segment. In short, user interface 2800 of FIG. 28 can be used to compare the resource load of all resources with the resource load of a particular resource.

Figure 29:
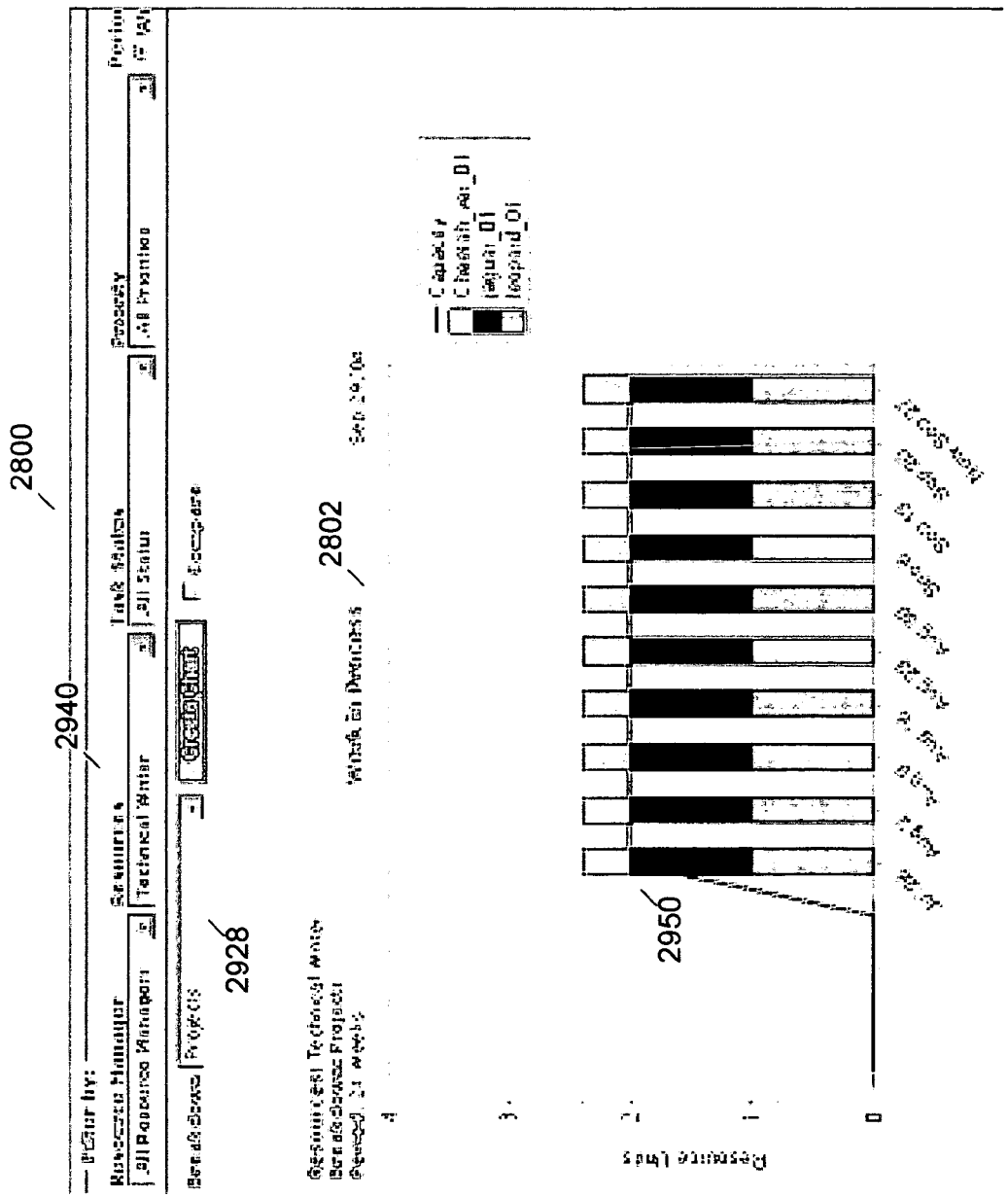
FIG. 29 is a screenshot of the user interface of FIG. 28 after additional selections have been made.

FIG. 29 is a screenshot of the user interface 2800 of FIG. 28 after additional selections have been made. User interface 2800 shows the result of selecting a resource from the resource pull down menu 2940, selecting a project from the breakdown pull down menu 2928 and reducing the bar chart to one bar per time period. The bar for each time period is separated into different segments, wherein each segment represents a different project and wherein the segments indicate how much of the resource load for each time period is attributed to each project. The horizontal line 2950 in the bar chart 2802 shows a resource load threshold indicator that indicates the amount of resource load that can be supported by the available resources for a group of tasks pertaining to each time period. In short, user interface 2800 of FIG. 29 can be used to view the resource load (broken down by particular projects) for different time periods, in addition to viewing a resource load threshold indicator.

The present invention can be realized in hardware, software, or a combination of hardware and software in the system described in FIG. 2. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 15:
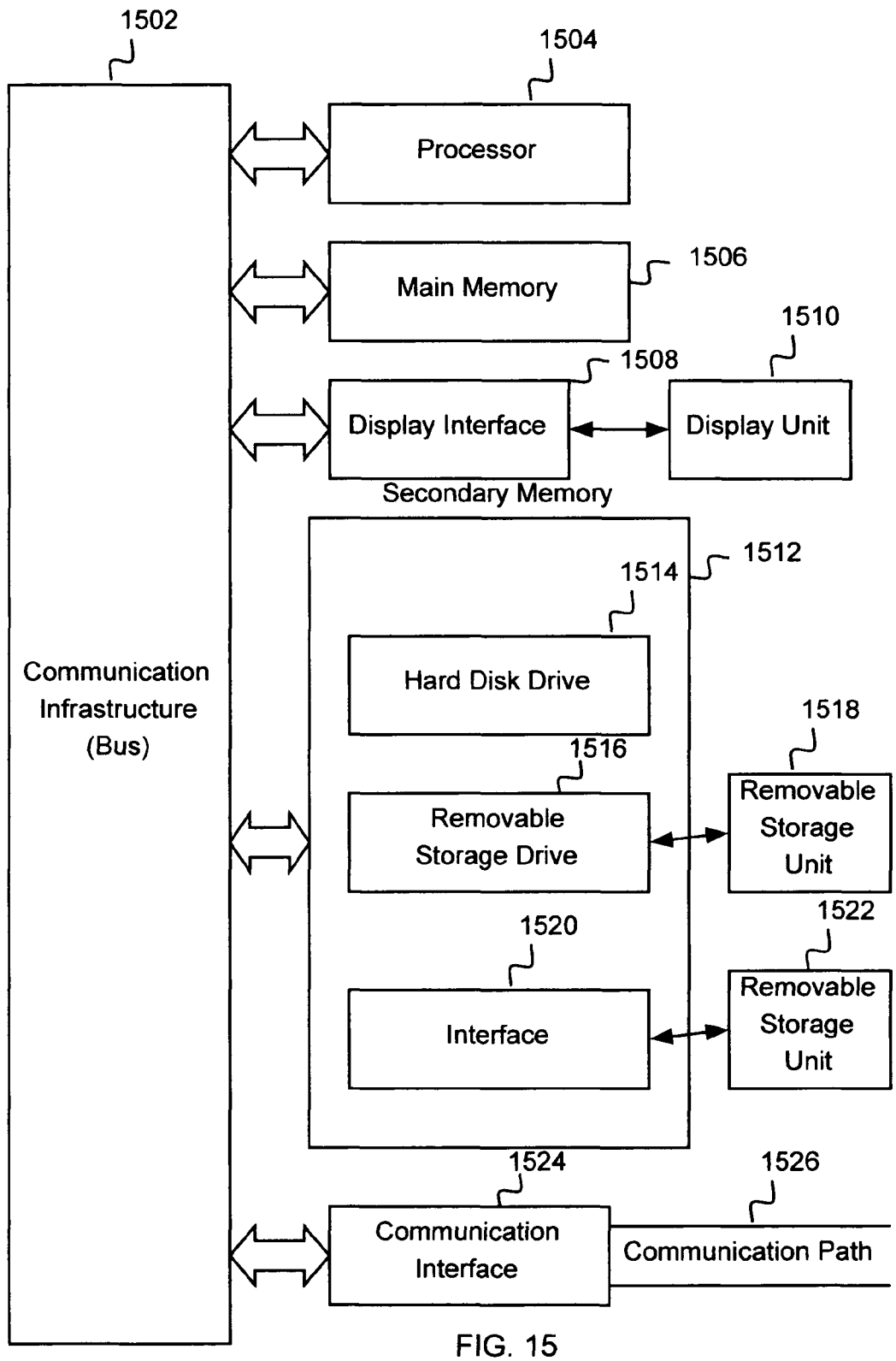
FIG. 15 is a block diagram of an information processing system useful for implementing the present invention.

FIG. 15 is a block diagram of a computer system useful for implementing an embodiment of the present invention. The computer system of FIG. 15 is a more detailed representation of computers 106 through 108 or system 102. The computer system of FIG. 15 includes one or more processors, such as processor 1504. The processor 1504 is connected to a communication infrastructure 1502 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1508 that forwards graphics, text, and other data from the communication infrastructure 1502 (or from a frame buffer not shown) for display on the display unit 1510. The computer system also includes a main memory 1506, preferably random access memory (RAM), and may also include a secondary memory 1512. The secondary memory 1512 may include, for example, a hard disk drive 1514 and/or a removable storage drive 1516, representing a floppy disk drive, a magnetic tape drive, an optical disk drive, etc. The removable storage drive 1516 reads from and/or writes to a removable storage unit 1518 in a manner well known to those having ordinary skill in the art. Removable storage unit 1518, represents, for example, a floppy disk, magnetic tape, optical disk, etc. which is read by and written to by removable storage drive 1516. As will be appreciated, the removable storage unit 1518 includes a computer usable storage medium having stored therein computer software and/or data.

In alternative embodiments, the secondary memory 1512 may include other similar means for allowing computer programs or other instructions to be loaded into the computer system. Such means may include, for example, a removable storage unit 1522 and an interface 1520. Examples of such may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to the computer system.

The computer system may also include a communications interface 1524. Communications interface 1524 allows software and data to be transferred between the computer system and external devices. Examples of communications interface 1524 may include a modem, a network interface (such as an Ethernet card), a communications port, a PCMCIA slot and card, etc. Software and data transferred via communications interface 1524 are in the form of signals which may be, for example, electronic, electromagnetic, optical, or other signals capable of being received by communications interface 1524. These signals are provided to communications interface 1524 via a communications path (i.e., channel) 1526. This channel 1526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1506 and secondary memory 1512, removable storage drive 1516, a hard disk installed in hard disk drive 1514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1506 and/or secondary memory 1512. Computer programs may also be received via communications interface 1524. Such computer programs, when executed, enable the computer system to perform the features of the present invention as discussed herein. In particular, the computer programs, when executed, enable the processor 1504 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method executed on a computer for providing critical chain-based project management, comprising:
   generating a plurality of project plans having a critical chain, each of the plurality of project plans corresponding to one of a plurality of projects, wherein a project comprises a plurality of tasks;
   generating buffers, blocks of unscheduled time, for each of the plurality of projects, wherein at least one of the buffers generated is placed on the critical chain;
   reconciling project resources among the plurality of projects such that priority is given to resource needs of the critical chain;
   executing the plurality of project plans;
   generating a list of sequential time periods for a project of the plurality of projects;
   calculating a number of tasks for each time period of the generated list of sequential time periods;
   generating a graphic that visually indicates the number of tasks for each time period and a priority of each task of the number of tasks for each time period;
   providing the graphic to a user via a graphical user interface; and
   continuously modifying a priority of any task of the number of tasks based on a project buffer consumption percentage of a longest chain to which the task belongs and based on a chain completion percentage of the longest chain to which the task belongs, wherein the priority of the task is calculated across the plurality of projects so as to accommodate the critical chain.

2. The method of claim 1, wherein the first step of generating a list comprises:
   generating a list of sequential time periods for the project, wherein each time period comprises any one of: a day, a week, a month, and a year.

3. The method of claim 1, wherein the step of calculating a number comprises:
   calculating a number of tasks for each time period and reading at least one of the following for each task:
   a priority of the task;
   a division of the task;
   a portfolio of the task;
   a business unit of the task;
   a project of the task;
   a customer of the task;
   a project manager of the task;
   a task manager of the task; and
   a status of the task.

4. The method of claim 3, wherein the step of generating a graphic comprises:
generating a graphic that visually indicates the number of tasks for each time period and at least one of the following for each task for each time period:
a priority;
a division;
a portfolio;
a business unit;
a project;
a customer;
a project manager;
a task manager; and
a status.

5. The method of claim 4, wherein the step of generating a graphic further comprises:
generating a bar graph including a bar for each time period, wherein each bar visually indicates the number of tasks for each time period and at least one of the following for each task for each time period:
a priority;
a division;
a portfolio;
a business unit;
a project;
a customer;
a project manager;
a task manager; and
a status.

6. The method of claim 5, wherein the step of providing the graphic comprises:
providing the bar graph to a user via a network connection.

7. The method of claim 1, wherein the step of generating a graphic further comprises:
generating a bar graph including a bar for each time period, wherein each bar visually indicates the number of tasks for each time period and a priority of each task for each time period.

8. The method of claim 7, wherein the step of providing the graphic comprises:
providing the bar graph to a user via a network connection.

9. A method executed on a computer for providing critical chain-based project management, comprising:
generating a plurality of project plans having a critical chain, each of the plurality of project plans corresponding to one of a plurality of projects, wherein a project comprises a plurality of tasks;
generating buffers, blocks of unscheduled time, for each of the plurality of projects, wherein at least one of the buffers generated is placed on the critical chain;
reconciling project resources among the plurality of projects such that priority is given to resource needs of the critical chain;
executing the plurality of project plans;
generating a list of sequential time periods for a project of the plurality of projects, wherein a task is either in-progress or pending;
calculating a number of in-progress and pending tasks for each time period of the generated list of sequential time periods;
generating a first graphic that visually indicates a number of in-progress tasks for each time period and a priority of each in-progress task for each time period;
generating a second graphic that visually indicates a number of pending tasks for each time period and a priority of each pending tasks for each time period;
providing the first and second graphic to a user via a graphical user interface, wherein the first graphic is displayed juxtaposed to the second graphic so as to visually convey a comparison between the first and second graphic; and
continuously modifying a priority of any task of the number of tasks based on a project buffer consumption percentage of a longest chain to which the task belongs and based on a chain completion percentage of the longest chain to which the task belongs, wherein the priority of the task is calculated across the plurality of projects so as to accommodate the critical chain.

10. The method of claim 9, wherein the first step of generating a list comprises:
generating a list of sequential time periods for the project, wherein each time period comprises any one of: a day, a week, a month, and a year.

11. The method of claim 9, wherein the step of calculating a number comprises:
calculating a number of in-progress and pending tasks for each time period and reading at least one of the following for each task:
a priority of the task;
a division of the task;
a portfolio of the task;
a business unit of the task;
a project of the task;
a customer of the task;
a project manager of the task;
a task manager of the task; and
a status of the task.

12. The method of claim 11, wherein the step of generating comprises:
generating a first graphic that visually indicates a number of in-progress tasks for each time period and at least one of the following for each in-progress tasks for each time period:
a priority;
a division;
a portfolio;
a business unit;
a project;
a customer;
a project manager;
a task manager; and
a status.

13. The method of claim 12, wherein the step of generating comprises:
generating a second graphic that visually indicates a number of pending tasks for each time period and at least one of the following for each pending task for each time period:
a priority;
a division;
a portfolio;
a business unit;
a project;
a customer;
a project manager;
a task manager; and
a status.

14. The method of claim 9, wherein the step of generating further comprises:
generating a bar graph including a bar for each time period, wherein each bar visually indicates the number of in-progress tasks for each time period and at least one of the following for each in-progress task for each time period:
a priority;

a division;
a portfolio;
a business unit;
a project;
a customer;
a project manager;
a task manager; and
a status.

15. The method of claim 14, wherein the step of generating further comprises:
    modifying the bar graph to include an additional bar for each time period, wherein each bar visually indicates the number of pending tasks for each time period and at least one of the following for each pending task for each time period:
    a priority;
    a division;
    a portfolio;
    a business unit;
    a project;
    a customer;
    a project manager;
    a task manager; and
    a status.

16. The method of claim 15, wherein the step of providing the first and second graphic comprises: providing the bar graph to a user via a network connection.

17. A computer system for providing critical chain-based project management, comprising:
    a database for storing project plans for a project comprising a plurality of tasks;
    a processor configured for:
        generating a plurality of project plans having a critical chain, each of the plurality of project plans corresponding to one of a plurality of projects;
        generating buffers, blocks of unscheduled time, for each of the plurality of projects, wherein at least one of the buffers generated is placed on the critical chain;
        reconciling project resources among the plurality of projects such that priority is given to resource needs of the critical chain;
        executing the plurality of project plans;
        generating a list of sequential time periods for a project of the plurality of projects;
        calculating a number of tasks for each time period of the generated list of sequential time periods; and
        generating a graphic that visually indicates the number of tasks for each time period and a priority of each task of the number of tasks for each time period;
    a graphical user interface for providing the graphic to a user; and
    continuously modifying a priority of any task of the number of tasks based on a project buffer consumption percentage of a longest chain to which the task belongs and based on a chain completion percentage of the longest chain to which the task belongs, wherein the priority of the task is calculated across the plurality of projects so as to accommodate the critical chain.

18. The computer system of claim 17, wherein the computer system comprises:
    a computer system for providing critical chain-based project management across a plurality of projects for multiple users.

19. The computer system of claim 18, wherein the graphical user interface is provided over a network, such as a WAN.

20. A method executed on a computer for providing critical chain-based project management, comprising:
    generating a plurality of project plans having a critical chain, each of the plurality of project plans corresponding to one of a plurality of projects, wherein a project comprises a plurality of tasks;
    generating buffers, blocks of unscheduled time, for each of the plurality of projects, wherein at least one of the buffers generated is placed on the critical chain;
    reconciling project resources among the plurality of projects such that priority is given to resource needs of the critical chain;
    executing the plurality of project plans;
    generating a list of sequential time periods for a project of the plurality of projects;
    calculating a resource load for tasks pertaining to each time period of the generated list of sequential time periods;
    generating a graphic that visually indicates the resource load for tasks pertaining to each time period and a priority of each task of the number of tasks for each time period;
    providing the graphic to a user via a graphical user interface; and
    continuously modifying a priority of any task of the number of tasks based on a project buffer consumption percentage of a longest chain to which the task belongs and based on a chain completion percentage of the longest chain to which the task belongs, wherein the priority of the task is calculated across the plurality of projects so as to accommodate the critical chain.

21. The method of claim 20, wherein the first step of generating a list comprises:
    generating a list of sequential time periods for the project, wherein each time period comprises any one of: a day, a week, a month, and a year.

22. The method of claim 20, wherein the step of calculating a resource load comprises:
    calculating a resource load for tasks pertaining to each time period and reading at least one of the following for each task:
    a priority of the task;
    a division of the task;
    a portfolio of the task;
    a business unit of the task;
    a project of the task;
    a customer of the task;
    a project manager of the task;
    a task manager of the task; and
    a status of the task.

23. The method of claim 22, wherein the step of generating comprises:
    generating a graphic that visually indicates the resource load for tasks pertaining to each time period and at least one of the following for each task for each time period:
    a priority;
    a division;
    a portfolio;
    a business unit;
    a project;
    a customer;
    a project manager;
    a task manager; and
    a status.

24. The method of claim 23, wherein the step of generating further comprises:
    generating a bar graph including a bar for each time period, wherein each bar visually indicates the resource load for tasks pertaining to each time period and at least one of the following for each task for each time period:
a priority;
a division;
a portfolio;
a business unit;
a project;
a customer;
a project manager;
a task manager; and
a status.

* * * * *